US007474340B2

(12) United States Patent
Hirai et al.

(10) Patent No.: US 7,474,340 B2

(45) Date of Patent: Jan. 6, 2009

(54) IMAGE DATA STORAGE METHOD AND SYSTEM

(75) Inventors: Seiichi Hirai, Koshigaya (JP); Hirotada Ueda, Kokubunji (JP); Mitsue Ito, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 727 days.

(21) Appl. No.: 10/696,039

(22) Filed: Oct. 30, 2003

(65) Prior Publication Data

US 2004/0090542 A1 May 13, 2004

(30) Foreign Application Priority Data

Oct. 31, 2002 (JP) ............................. 2002-318509

(51) Int. Cl.
*H04N 5/76* (2006.01)

(52) U.S. Cl. ................................ 348/231.1; 348/231.5

(58) Field of Classification Search ................. 348/143, 348/152, 153, 207.11, 231.5, 207.1, 333.04, 348/231.1

See application file for complete search history.

(56) References Cited

U.S. PATENT DOCUMENTS 6,698,021 B1 * 2/2004 Amini et al. ................ 725/105
2002/0016971 A1 * 2/2002 Berezowski et al. ........ 725/105
2002/0175995 A1 * 11/2002 Sleeckx ...................... 348/143
2002/0191952 A1 * 12/2002 Fiore et al. .................... 386/46
2003/0081121 A1 * 5/2003 Kirmuss ..................... 348/143
2004/0021669 A1 * 2/2004 Fredlund et al. ............ 345/530
2004/0075750 A1 * 4/2004 Bateman .................. 348/231.1

FOREIGN PATENT DOCUMENTS

JP 200169462 3/2001
JP 2001203975 7/2001
JP 200273047 3/2002
JP 2002135693 5/2002

* cited by examiner

*Primary Examiner*—Justin P Misleh
(74) *Attorney, Agent, or Firm*—Mattingly, Stanger, Malur & Brundidge, P.C.

(57) ABSTRACT

An image data storage method and system for editing image date transmitted from an image producing apparatus through a network and storing it in a removable recording medium includes a network, an image producing apparatus for transmitting image data through the network, an image storing and delivering server for storing the image data transmitted from the image producing apparatus through the network and delivering it through the network, an image receiving apparatus for communicating with the image storing and delivering server through the network to receive the image data from the image storing and delivering server, and an external recording apparatus combined with the image receiving apparatus for storing the image data from the image receiving apparatus in a recording medium. The image receiving apparatus stores reproduction software for reproducing the image data in the recording medium together with image data.

7 Claims, 20 Drawing Sheets

表示切替　完パケクリップ一覧に切替

● カットクリップ一覧

| 選択 | 番号 | 代表画像 | 概　要 |
|---|---|---|---|
| 1901 1905 | 0 | TCF 00:15:05:14 | チャンネル番号：8<br>2002/07/12 09:59:55:00～2002/07/12 10:00:04:29<br>工場玄関<br>赤い車はBMW Z3 |
| 1902 1906 | 1 | | チャンネル番号：5<br>2002/07/26 13:00:00:00～2002/07/26 13:00:33:09<br>工場正門 |
| 1903 1907 | 2 | | チャンネル番号：2<br>2002/08/03 17:31:00:00～2002/08/03 17:31:32:09<br>SHOWPIECE |
| 1904 1908 | 3 | | チャンネル番号：1<br>2002/10/07 13:30:00:00～2002/10/07 13:30:13:11<br>工場E棟前 |

```
<REPRODUCTION SOFTWARE FILE>.
¥PSPlay.exe</REPRODUCTION SOFTWARE FILE>

<IMAGE OF STORAGE SECTION>
  <NUMBER VALUE="0"/>
  <LENGTH VALUE ="300"/>
  <CHANNEL NUMBER VALUE="8"/>
  <IN-POINT VALUE="2002/07/12 09:59:55:00"/>
  <OUT-POINT VALUE="2002/07/12 10:00:04:29"/>
  <NOTE VALUE="ENTRANCE OF FACTORY"/>
  <NOTE VALUE="RED CAR IS BMW Z3"/>
  <STREAM FILE VALUE=".¥Stream0.xm1"/>
  <REPRESENTATIVE IMAGE FILE VALUE=".¥0_0000.jpg"/>
</IMAGE OF STORAGE SECTION>
<IMAGE OF STORAGE SECTION>
  <NUMBER VALUE="1"/>
  <LENGTH VALUE ="1000"/>
  <CHANNEL NUMBER VALUE="5"/>
  <IN-POINT VALUE="2002/07/26 13:00:00:00"/>
  <OUT-POINT VALUE="2002/07/26 13:00:33:09"/>
  <NOTE VALUE="MAIN GATE OF FACTOR"/>
  <STREAM FILE VALUE=".¥Stream1.xm1"/>
  <REPRESENTATIVE IMAGE FILE VALUE".¥1_0000.jpg"/>
</IMAGE OF STORAGE SECTION>
<IMAGE OF STORAGE SECTION>
  <NUMBER VALUE="2"/>
  <LENGTH VALUE"970"/>
  <CHANNEL NUMBER="2"/>
  <IN-POINT VALUE="2002/08/03 17:31:00:00"/>
  <OUT-POINT VALUE="2002/08/03 17:31:32:09"/>
  <NOTE VALUE="SHOWPIECE"/>
  <STREAM FILE VALUE=".¥Stream2.xm1"/>
  <REPRESENTATIVE IMAGE FILE VALUE".¥2_0000.jpg"/>
</IMAGE OF STORAGE SECTION>
          :
        (OMIT)
          .
<STORAGE EXECUTION IMAGE>
  <NUMBER>0</NUMBER>
  <ORDER>0,1,2,3</ORDER>
  <NOTE VALUE="FACTORY AREA"/>
</STORAGE EXECUTION IMAGE>
<STORAGE EXECUTION IMAGE>
  <NUMBER>1</NUMBER>
  <ORDER>4,5,6</ORDER>
  <NOTE VALUE="IMAGE FROM CAMERA"/>
</STORAGE EXECUTION IMAGE>
```

2402
```
<FRAME>
  <NUMBER>0</NUMBER>
  <IMAGE FILE NAME>.¥2_0000.jpg</IMAGE FILE NAME>
</FRAME>
```
2403
```
<FRAME>
  <NUMBER>1</NUMBER>
  <IMAGE FILE NAME>.¥2_0001.jpg</IMAGE FILE NAME>
</FRAME>
```
2404
```
<FRAME>
  <NUMBER>2</NUMBER>
  <IMAGE FILE NAME>.¥2_0002.info</IMAGE FILE NAME>
</FRAME>
```
2405
```
<FRAME>
  <NUMBER>3</NUMBER>
  <IMAGE FILE NAME>.¥2_0003.info</IMAGE FILE NAME>
</FRAME>
```
2406
```
<FRAME>
  <NUMBER>4</NUMBER>
  <IMAGE FILE NAME>.¥2_0004.info</IMAGE FILE NAME>
</FRAME>
```
2407
```
<FRAME>
  <NUMBER>5</NUMBER>
  <IMAGE FILE NAME>.¥2_0005.info</IMAGE FILE NAME>
</FRAME>
```

:

(OMIT)

.

2408
```
<FRAME>
  <NUMBER>969</NUMBER>
  <IMAGE FILE NAME>.¥2_0969.jpg</IMAGE FILE NAME>
</FRAME>
```

IMAGE DATA STORAGE METHOD AND SYSTEM

BACKGROUND OF THE INVENTION

The present invention relates to a monitoring system for transmitting, receiving and recording image taken by an imaging apparatus such as a monitoring camera through a network and more particularly to an image monitoring method and system for storing image desired to be preserved over a long time.

Image monitoring systems are heretofore installed in facilities such as hotels, buildings, convenience stores, financial agencies, dams or roads for the purpose of prevention of crime and accident.

In the image monitoring system, a scene in a place to be monitored is taken by an imaging apparatus such as a camera and its image is transmitted to a monitoring center such as a superintendent's office or guardroom, so that the transmitted image is displayed on a monitoring screen to be monitored by a guard. Attention or warning is given according to the purpose of the system or as the need arises or the image data is recorded to be preserved. The image data contains voice and information accompanying the image (e.g. photographic place and time, photographer, information relative to the copyright or the right of portrait and conditions such as price) in addition to the image.

Recently, in the field of such a system, a network type image monitoring system is spreading in which the image taken by the imaging apparatus is digitized and transmitted through an IP (Internet Protocol) network represented by the Internet to thereby make monitoring.

At present, the network type image monitoring system of the main current is to deliver live image from an image transmission apparatus connected to an imaging apparatus such as a monitoring camera to an image receiving apparatus through a network and fits the monitoring form in which a monitoring person permanently stationed watches the live image at all times and copes with occurrence of a problem in accordance with conditions.

On the other hand, in the field of monitoring an image, there is another monitoring form in which the monitored image is recorded in addition to monitoring of the live image as described above and the recorded image is watched while retraced to the past when any problem occurs. The customer's need for such a record type monitoring form mainly exists in financial agencies and stores.

The network type image monitoring system includes an image storing and delivering server which can cope with the need for such a record type monitoring form.

Referring now to FIG. 2, an example of the network type image monitoring system including the image storing and delivering server is described. FIG. 2 schematically illustrates the conventional network type image monitoring system.

Numeral 101 denotes a network medium, 102 an image producing apparatus, 103 an image transmitting apparatus, 104 an image receiving apparatus, 105 an image display apparatus, 106 an image storing and delivering server and 107 a recording medium.

In FIG. 2, the network medium 101 is, for example, network cable, radio LAN (Local Area Network), public network or the like and has the function of transmitting data. Further, the network medium includes network apparatuses such as routers and hubs.

The image transmitting apparatus 103, the image receiving apparatus 104 and the storing and delivering server 106 are connected to the network medium 101 so that they can communicate with each other.

The image producing apparatus 102 includes, for example, an image pick-up unit such as a camera, which converts light into electricity to produce image.

The image transmitting apparatus 103 is constituted by, for example, an encoder apparatus including an interface for receiving image data from the image producing apparatus 102, an image codec and an network interface and converts input image data from the image production apparatus 102 into a form suitable for network transmission to be transmitted to the network medium 101. For example, when the input image from the image producing apparatus 102 is analog image, the image transmitting apparatus converts the analog image into digital image and compresses the digital image in accordance with the transmission band of the network medium 101 if necessary.

The image producing apparatus 102 and the image transmitting apparatus 103 may be a form combined into one apparatus.

The image receiving apparatus 104 is constituted by, for example, a decoder apparatus including an network interface, an image codec and an interface for outputting the image to at least one image display apparatus 105 and receives image data transmitted through the network medium 101 and converts the image data into a form that can be displayed by the image display apparatus 105 to be outputted to the image display apparatus 105. For example, when the image display apparatus 105 is a television monitor, analog conversion is made. Further, when the received image data is compressed image data, the image codec is used to expand the compressed image data.

The image display apparatus 105 displays the inputted image. The image display apparatus 105 includes, for example, a projecting device such as a television monitor, a CRT (Cathode-Ray Tube) of a computer or a liquid crystal monitor and converts electricity into light to be displayed as image.

The image receiving apparatus 104 and the image display apparatus 105 may be a form combined into one apparatus. It may include, for example, a form included in a television monitor, a form of a computer connected to a CRT or a form of a portable terminal such as a portable telephone equipped with a display device.

Further, the image receiving apparatus 104 also includes an operation interface for instructing the storing and delivering server 106 to make reproduction, fast-forwarding and the like. This interface may be, for example, a GUI (Graphical User Interface) displayed on a computer screen or a control panel terminal connected to the image receiving apparatus 104.

The storing and delivering server 106 is constituted by, for example, a personal computer (PC) including a network interface and an interface to the recording medium and has the function of receiving image data transmitted from the image transmitting apparatus 103 through the network medium 101 and recording the image data in the recording medium 107 connected thereto and the function of obtaining requested image data from the recording medium 107 in response to an image delivery request from the image receiving apparatus 104 and delivering the requested image data to the image receiving apparatus 104 through the network medium 101.

Further, the storing and delivering server 106 includes reproduction software stored therein. The image receiving apparatus 104 can receive the reproduction software in the download manner and can reproduce the image data delivered from the storing and delivering server 106.

The recording medium 107 is a medium such as, for example, a hard disk or a disk array for recording image data and is connected to the storing and delivering server 106 through a dedicated interface such as, for example, SCSI (Small Computer System Interface), ATA (AT Attachment) or FC (Fibre Channel) or an interface using an IP network such as SAN (Storage Area Network) or NAS (Network Attached Storage).

In FIG. 2, the image producing apparatus 102, the image transmitting apparatus 103, the image receiving apparatus 104 and the image display apparatus 105 are expressed by ones, although each of these apparatuses may be connected to the storing and delivering server 106 in the plural manner.

The storing and delivering server 106 can receive a plurality of different image data transmitted from a plurality of image transmitting apparatuses 103 simultaneously and record them. Further, in parallel therewith, the storing and delivering server 106 can deliver the plurality of different image data to a plurality of image receiving apparatuses 104 simultaneously. A unit in case where a series of image transmitted from an image transmitting apparatus is treated is named channel.

The physical capacity of the recording medium 107 connected to the storing and delivering server 106 is limited. The recording medium 107 is usually full in capacity in the course of time with difference in days depending on the size of image to be recorded or the frequency of recording when data is recorded therein continuously. Each time the recording medium is full, it is necessary to stop recording of data in the recording medium 107 in order to exchange the recording medium 107 or erase the recording medium 107 once and reuse it.

Such stop leads to a fatal problem in the case of the system in which monitoring and recording are made at all times (24 hours throughout the year) or when the time that recording is stopped is coincident with the time that the monitoring and recording are required.

In order to overcome the above problem, the storing and delivering server 106 adopts a so-called circulative recording system in which a virtual recording medium is constructed in the recording medium 107 by means of software and image is continued to be overwritten on old image automatically when the recording medium is full in capacity, so that nonstop operation is realized irrespective of the physical capacity of the recording medium 107.

Further, the storing and delivering server 106 is designed to have high performance and high reliability so that all objects to be recorded are recorded without error since the objects to be recorded are live image which disappears in a moment. Accordingly, the recording medium 107 is also often constructed into array configuration to have high performance and high reliability. The array configuration means the recording medium configuration such as, for example, RAID, having the redundancy.

SUMMARY OF THE INVENTION

The above-mentioned conventional circulative recording system realizes the nonstop operation. However, in the record type monitoring system, there are the needs of desiring that not only image is recorded but also the recorded image is preserved for a long time. In the conventional circulative recording system, new image is overwritten on the portion where old image is recorded, that is, the old recorded image is erased and accordingly it is difficult to satisfy the needs of desiring that the recorded image is preserved for a long time. Further, it is expensive to increase the physical capacity of the recording medium. Since the recording medium is constructed into the array configuration due to the above reason, the preservation is not easy in the physical aspects of size, weight and the like.

It is an object of the present invention to provide a method and system with a low cost and high preservation including the above-mentioned storing and delivering server as a core and capable of meeting the needs for the long-term preservation while utilizing the nonstop operation by the circulative recording system of the storing and delivering server.

It is another object of the present invention to provide an image data editing, recording and reproducing method capable of not only recording image to be monitored but also easily editing all image data transmitted from unspecified image transmitting apparatuses momently or at irregular intervals by unspecified requisite image receiving apparatuses and recording the image data in a removable reproducible recording medium.

In order to achieve the above object, according to the present invention, a two-stage configuration system is adopted in which a storing and delivering server and an apparatus for recording image data in a recording medium of the long-term storage type (hereinafter referred to as a long-term storage type recording apparatus) are provided separately and connected to each other through a network, so that image desired to be stored for a long term, of the image recorded in the storing and delivering server is recorded in the long-term storage type recording apparatus again.

In other words, the image data storage system according to the present invention is provided as the primary recording apparatus realizing the nonstop operation that all live image is recorded without error as a most important point while utilizing recording by the conventional circulative recording system and the long-term storage type recording apparatus is provided as the secondary recording apparatus realizing easiness of storage of the recording medium as a most important point.

Further, in the image data storage system of the present invention, the long-term storage type recording apparatus can utilize the features of the two-stage configuration system to selectively store any image in the storing and delivering server.

Moreover, in the image data storage system of the present invention, the long-term storage type recording apparatus uses a detachable or removable recording medium (hereinafter referred to as removable medium) in order to realize the easiness of storage of the recording medium.

Further, as far as the recording to the removable medium is made, a dedicated reproduction apparatus is not always disposed by the recording medium. The reproduction software is combined with the image data to be reproduced and stored in the removable medium to thereby make it possible to reproduce the image data stored in the removable medium (hereinafter referred to as long-term stored image) by means of a similar apparatus which can read the image data stored in the removable medium without using the dedicated reproduction apparatus.

In addition, the image data storage method and system of the present invention can combine the reproduction software with the image to be reproduced to be stored in the removable medium to thereby look or watch the long-term stored image over a long time without influence of change of version of the reproduction software.

More particularly, the image data storing method according to an aspect of the present invention comprises a step of obtaining image data from an image pick-up unit, a step of recording the image data in a first recording apparatus, a step of retrieving the image data recorded in the first recording apparatus in accordance with a predetermined retrieval condition, a step of displaying the retrieved image data as a list of information relating to said retrieved image data, and a step of selecting a predetermined information from the list of information, reading said selected image data from said first recording apparatus and recording the read out image data relating to the selected information in a second recording apparatus.

It is preferable that the image data contains information from a sensor and the list of information contains information from the sensor.

It is preferable that the image data is further added with time information that the image data is obtained and the list of information contains the time information.

It is preferable that the image pick-up unit includes a plurality of image pick-up devices and the image data obtained from each of the image pick-up devices is added with ID for identifying each of the image pick-up devices. The list of information further contains the ID.

It is preferable that the step of displaying the retrieved image data as the list further includes a step of designating in- and out-points for selecting desired image data.

It is preferable that the step of recording the selected image data relating to said selected information in the second recording apparatus further includes a step of recording reproduction software for reproducing the recorded image data together with the recorded image data.

It is preferable that the second recording apparatus includes a removable recording medium.

A storing system of image data according to another aspect of the present invention comprises a plurality of image pick-up units for outputting image data, a transmission unit for transmitting the image data from the plurality of image pick-up units to a transmission path, a first recording apparatus coupled with the transmission path for recording the image data from the plurality of image pick-up units, a retrieving processing unit for retrieving the image data recorded in the first recording apparatus in accordance with a predetermined retrieval condition, a display unit for displaying the retrieved image data as a list of information relating to the retrieved image data, a selector for selecting predetermined information from the list of information and reading out the selected image data selecting to the selected information in the list from the first recording apparatus, and a second recording apparatus for recording the selected image data.

It is preferable that the storing system further includes a sensor and the image data contains information from the sensor and the list of information contains information from the sensor.

It is preferable that the image data is further added with time information that the image data is obtained and the list of information contains the time information.

It is preferable that the image data obtained from each of the plurality of image pick-up units is added with ID for identifying each of the plurality of image pick-up units and the list of information further contains the ID.

Other objects, features and advantages of the invention will become apparent from the following description of the embodiments of the invention taken in conjunction with the accompanying drawings.

BRIEF DESCRIPTION OF THE DRAWINGS

FIG. 23 is a diagram showing an embodiment of data description structure in a starting file of the present invention;

FIG. 24 is a diagram showing an embodiment of data description structure in a stream file of the present invention;

DESCRIPTION OF THE EMBODIMENTS

Figure 1:
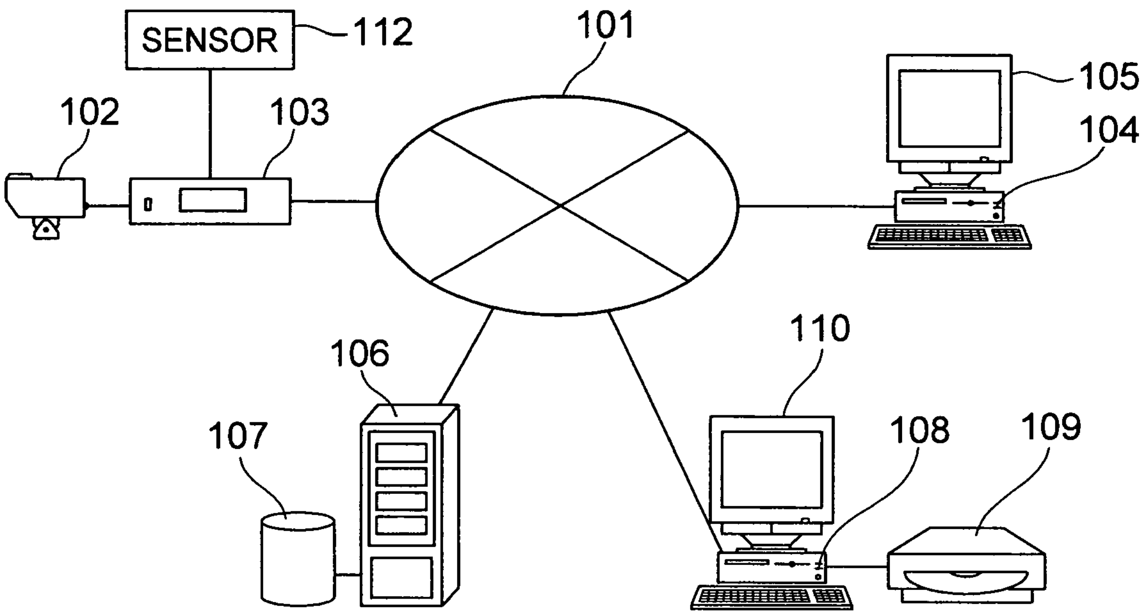
FIG. 1 is a block diagram schematically illustrating an embodiment of an image data storage system according to the present invention.

Embodiments of the present invention are now described with reference to the accompanying drawings, in which like elements are designated by like reference numeral.

Figure 2:
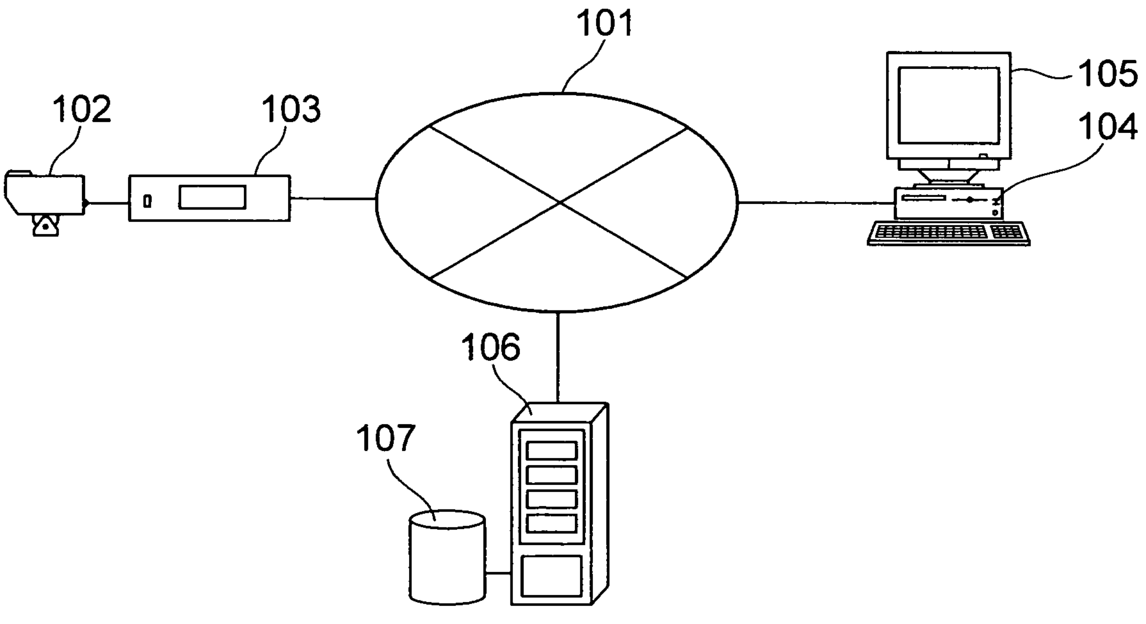
FIG. 2 is a block diagram schematically illustrating a conventional network type image monitoring system.

FIG. 1 is a block diagram schematically illustrating an image data storage system according to the present invention. Constituent elements having the same function as those described in the prior art of FIG. 2 are given like numerals. Further, numeral 108 denotes a long-term storage type recording apparatus, 109 a removable medium and 110 an image display apparatus.

The image transmitting apparatus 103, the image receiving apparatus 104, the storing and delivering server 106 and the long-term storage type recording apparatus 108 are connected to the network medium 101 to make it possible to communicate with each other.

A sensor 112 may be connected to the image transmitting apparatus 103 and detection information from the sensor 112 may be added to an output signal of the image transmitting apparatus 103 to be outputted to the network medium 101. When an infrared sensor is used as the sensor 112, the sensor 112 outputs a signal when any object passes through a sensing area of the sensor, so that the image data produced three seconds earlier than the output signal is transmitted together with the sensor information (sensor number and the like) to the network medium 101 and the transmission is stopped three seconds after it cannot be detected. When a motion sensor is used as the sensor 112, a signal is outputted by the sensor 112 when passage of an object is detected, so that image data produced three seconds earlier than the output signal is transmitted together with the sensor information (sensor number and the like) to the network medium 101 and the transmission is stopped three seconds after it cannot be detected. Even when a sound sensor is used as the sensor 112, a signal is outputted by the sensor 112 when any object passes through the sensing area of the sensor, so that the same operation is made. Even when other various sensors are used, the same operation is made.

The image transmitting apparatus 103 further adds information for identifying the imaging apparatus 102 which produces image data and time information that the image data is obtained to the sensor information. The time information contains year, month, date, hour, minute, second and frame number.

In FIG. 1, the image producing apparatus 102, the image transmitting apparatus 103, the image receiving apparatus 104 and the image display apparatus 105 are shown by ones, although these apparatuses for 30 channels, for example, are connected to the network medium 101 in practical use. Further, the recording medium 107 of the storing and delivering server 106 has the memory capacity that image data for 30 channels and one week, for example, can be stored.

The long-term storage type recording apparatus 108 includes, for example, a network interface, an image codec, an interface for outputting image data to the image display apparatus 110 and a recording interface to the removable medium 109 and receives image data transmitted from the storing and delivering server 106 through the network medium 101. If necessary, the long-term storage type recording apparatus 108 stores the received image data in the removable medium 109 and converts the image data into a form that can be displayed by the image display apparatus 110 to be outputted. The image display apparatus 110 not only can display the image data but also may produce voice, for example, if it is possible.

The long-term storage type recording apparatus 108 and the image display apparatus 110 may be combined into one apparatus. It may be included in a television monitor or it may be a computer having a CRT connected thereto, for example.

Further, the long-term storage type recording apparatus 108 also includes an operation interface for instructing the storing and delivering server 106 to make reproduction, fast-forwarding and the like and an operation interface for instructing the removable medium 109 to store image data. The interface may be GUI displayed on a computer screen or a control panel terminal connected to the long-term storage type recording apparatus 108.

The removable medium 109 is a combination of an optical medium such as, for example, DVD-RAM, MO and CD-RW and its drive or a hard disk mounted in a detachable case or a hard disk including a detachable interface such as USB and IEEE1394 and is a medium having the function of storing image data.

The removable medium 109 is connected to the long-term storage type recording apparatus 108 through a dedicated interface such as, for example, SCSI, ATT and FC or an interface using an IP network such as SAN and NAS or an interface detachable even during energization such as USB and IEEE1394.

Figure 3:
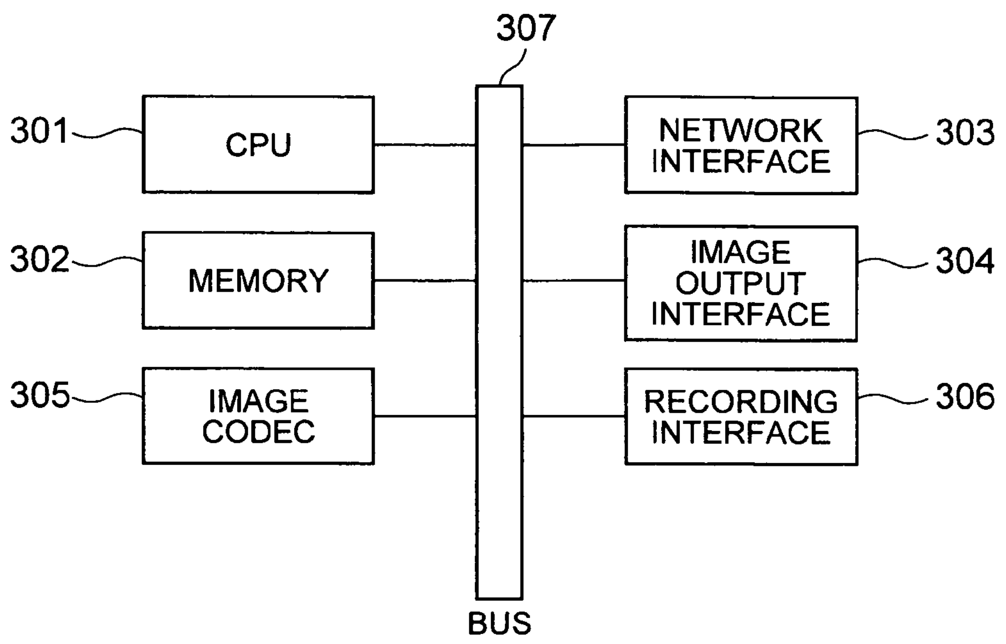
FIG. 3 is a block diagram illustrating the internal configuration of a long-term storage type recording apparatus of the present invention.

FIG. 3 is a block diagram illustrating the internal configuration of the long-term storage type recording apparatus 108. Numeral 301 denotes a CPU (Central Processing Unit), 302 a memory, 303 a network interface, 304 an image output interface, 305 an image codec, 306 a recording interface and 307 a bus. The CPU 301, the memory 302, the network interface 303, the image output interface 304, the image codec 305 and the recording interface 306 are connected to the bus 307 and the memory 302, the network interface 303, the image output interface 304, the image codec 305 and the recording interface 306 are controlled by signals from the CPU 301.

An embodiment of the image data storage method according to the present invention is now described with reference to FIG. 1 and examples of pictures shown in FIGS. 4 to 12.

As the precondition for making storage of image in present invention, in FIG. 1, it is assumed that the storing and delivering server 106 receives image data transmitted from the image transmitting apparatus 103 at all times and records the received image data in the recording medium 107. Further, it is assumed that the monitoring person operates the reproduction instructing interface of the image receiving apparatus 104 if necessary and takes out the image data at any time from the storing and delivering apparatus 106 to be displayed in the image display apparatus 105 for monitoring. That is, it is assumed that the monitoring person makes monitoring as usual.

In the main processing of the embodiment of the image data storage method according to the present invention, the procedure (operation) described later is made to the instruction interface of the long-term storage type recording apparatus 108 to thereby store image data at any time recorded in the storing and delivering server 106 into the removable medium 109.

The main processing is divided broadly into four stages from the point of view of the operation procedure. In the first stage, reproduction operation is made in order to look or watch image data recorded in the storing and delivering server 106. In the second stage, image data desired to be stored in the removable medium 109 is selected from the image data which can be looked by the reproduction operation and recording location (hereinafter referred to as storage section) of the selected image data is registered. In the third stage, the registered storage section is subjected to editing operation such as deletion of registration and correction of registered contents. In the fourth stage, the image data corresponding to the registered storage section is stored in the removable medium 109 actually.

The four stages each can move to another stage properly. For example, it is a matter of course that operation moves from the first stage to the second, third and fourth stages successively and it is possible that operation returns from the third stage to the second stage or returns to the first and second stages after completion of the fourth stage or repeats the fourth stage.

In the storage operation of image in the present invention, image storage software which is previously stored in the memory 302 of the long-term storage type recording apparatus 108 is started or a file corresponding to the image storage software is opened to thereby move to an initial picture.

First of all, the reproduction operation in the first stage, that is, the reproduction operation for looking image data recorded in the storing and delivering server 106 is described.

Figure 4:
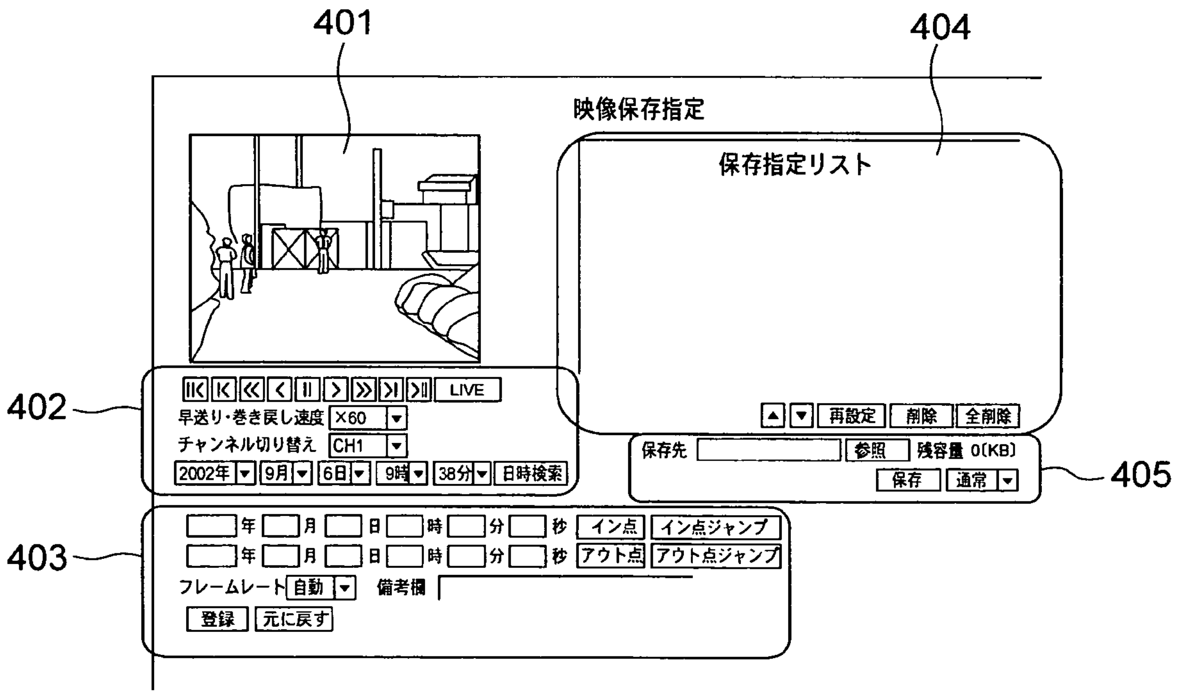
FIG. 4 is a diagram showing an embodiment of a picture displayed in an image display unit of the present invention.

FIG. 4 is a diagram showing an example of a picture displayed in the image display apparatus 110 for explaining the reproduction operation when an instruction interface of the long-term storage type recording apparatus 108 is provided by means of GUI in case where the long-term storage type recording apparatus 108 and the image display apparatus 110 are mounted in the form of the computer having a CRT connected thereto.

Further, the picture of FIG. 4 corresponds to the initial picture in case where storage of image is made.

The picture includes five areas having an image display area 401, a reproduction operation area 402, a storage section registration area 403, a list-of-storage-section display and operation area 404 and a storage execution instruction area 405. In FIG. 4, the meanings of the Japanese words in the picture are as follows. 映像保存指定. . . designation of image to be stored, 保存指定リスト. . . storage designation list, 早送り・巻戻し速度 . . . fast-forwarding/rewinding speed, チャンネル切替. . . change channel, 年、月、日、, 時、分、秒. . . year, month, date, hour, minute, second, 日時検索. . . retrieval of date, フレームレート. . . frame rate, 自動. . . auto, 登録. . . register, 元に戻す. . . restore, 備考欄. . . remark column, イン点. . . in-point, アウト点. . . out-point, イン点ジャンプ. . . jump to in-point, アウト点ジャンプ. . . jump to out-point, 保存先. . . storage location, 再設定. . . re-set, 削除. . . delete, 全削除. . . delete all, 参照. . . reference, 残容量. . . remaining capacity, 保存. . . store, 通常. . . usual.

The image display area 401 is an area in which image data taken out from the storing and delivering server 106 is displayed. The reproduction operation area 402 is an area in which buttons for instructing the storing and delivering server 106 to make reproduction are arranged. The storage section registration area 403 is an area in which buttons for registering storage section are arranged. The list-of-storage-section display and operation area 404 is an area in which a list of information relating to retrieved image data i.e. a list of storage sections registered by button operation of the storage section registration area 403 is displayed. Further, buttons for making editing operation such as replacement in order, deletion of registration, correction of registered contents and the like are also arranged in the picture.

The storage execution instruction area 405 is an area in which buttons for instructing recording of image data corresponding to the list of storage sections displayed in the list-of-storage-section display and operation area 404 in the removable medium 109 actually are arranged.

Figure 5:
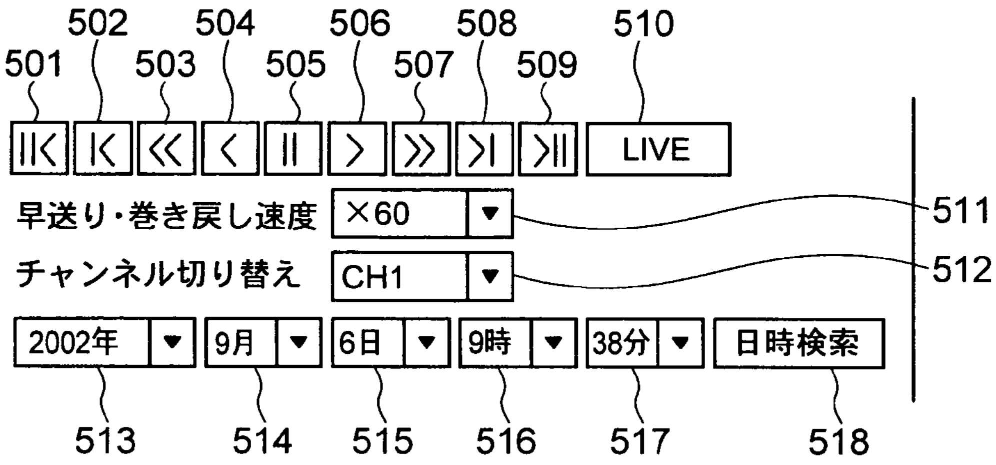
FIG. 5 is a diagram showing an embodiment of a picture displaying an reproduction operation area of the present invention on an enlarged scale.

FIG. 5 is a diagram showing the reproduction operation area 402 on an enlarged scale. Numeral 501 denotes a jump-to-top-image button, 502 a frame back button, 503 a rewind button, 504 a backward reproduction button, 505 a stop button, 506 a forward reproduction button, 507 a frame forwarding button, 508 a fast-forwarding button, 509 a jump-to-last-image button, 510 a live image change button, 511 a fast-forwarding/rewinding speed designation and selection button, 512 a channel selection button, 513 a year selection button, 514 a month selection button, 515 a date selection button, 516 an hour selection button, 517 a minute selection button and 518 a date retrieval button.

The jump-to-top-image 501 is a button for issuing a command for taking out the oldest image data from the image data recorded in the storing and delivering server and thereafter entering into a stop state. The frame back button 502 is a button for issuing a command for taking out image data of one frame older than the image data displayed currently in the reproduction display area 401 and thereafter entering into the stop state. The rewind button 503 is a button for issuing a command for continuing to take out image data at any reproduction speed in the old time direction starting from the image displayed currently in the reproduction display area 401. The backward reproduction button 504 is a button for issuing a command for continuing to take out image data in real time in the old time direction starting from the image data displayed currently in the reproduction display area 401. The stop button 505 is a button for issuing a command for stopping taking out of image data for the image data displayed currently in the reproduction display area 401.

The forward reproduction button 506 is a button for issuing a command for continuing to take out image data in real time in the new time direction starting from the image data displayed currently in the reproduction display area 401. The fast-forwarding button 507 is a button for issuing a command for continuing to take out image data at any reproduction speed in the new time direction from the image data displayed currently in the reproduction display area 401. The frame forwarding button 508 is a button for issuing a command for taking out image data of one frame newer than the image data displayed currently in the reproduction display area 401 and thereafter entering into the stop state. The jump-to-last-image button 509 is a button for issuing a command for taking out the newest image data from the image data recorded in the storing and delivering server and thereafter entering into the stop state. The live image change button 510 is a button for issuing a command for continuing to take out the newest image data from the image data recorded in the storing and delivering server. The fast-forwarding/rewinding speed designation and selection button 511 is a button for designating the reproduction speed at the time that the rewind button 503 or the fast forwarding button is operated. The channel selection button 512 is a button for designating change to image data of a channel desired to look.

The year selection button 513, the month selection button 514, the date selection button 515, the hour selection button 516 and the minute selection button 517 are buttons for designating the date that retrieval is made by means of the data retrieval button described below. The date retrieval button 518 is a button for issuing a command for retrieving image data corresponding to the date given by the buttons 513 to 517 to be taken out and thereafter entering into the stop state.

The buttons 501 to 518 are operated to thereby issue various reproduction commands so that image data obtained as a result is displayed in the image display area 401. The processing sequences (procedures) thereof are now described.

When any one of the buttons 501 to 518 is operated, its operation contents are detected by the CPU 301. The CPU 301 calculates or prepares an image request in response to the detected operation contents from the image data received last and stored in the memory 302 and the operation contents and transmits the image request to the storing and delivering server 106 through the network interface 303 and the network medium 101.

The storing and delivering server 106 receives the image request and transmits the image data suitable for the request to the long-term storage type recording apparatus 108 through the network medium 101. The long-term storage type recording apparatus 108 receives the image data through the network interface 303 and stores the image data in the memory 302. The image data stored in the memory 302 is read out to be transmitted to the image codec 305. The image codec 305 converts the image data into a form that can be displayed in the image display apparatus 110 and stores it in the memory 302 again. The image data stored in the memory 302 is outputted to the image display apparatus 110 through the image output interface 304 again and is displayed in the image display area shown in FIG. 4. The above processing sequence is repeated to thereby reproduce the image data (displayed as dynamic image).

Next, while the image data is being reproduced in accordance with the above operation and processing sequence, the operation in the second stage that image data desired to be stored in the removable medium 109 is selected and its storage section is registered is described.

Figure 6:
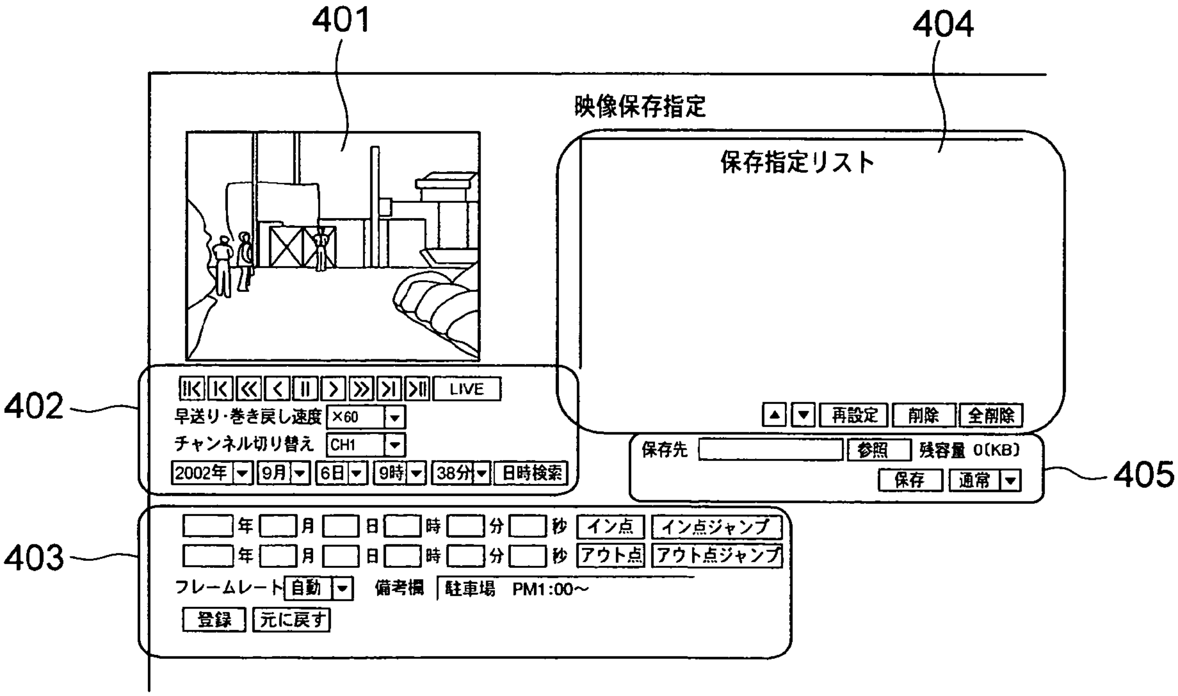
FIG. 6 is a diagram showing an embodiment of a picture displayed in the image display unit of the present invention.

FIG. 6 is a diagram showing an example of a picture displayed in the image display apparatus 110 for explaining the storage section registration operation when the instruction interface of the long-term storage type recording apparatus 108 is provided by means of GUI in case where the long-term storage type recording apparatus 108 and the image display apparatus 110 are mounted in the form of the computer having a CRT connected thereto in the same manner as FIG. 4. Note that the Japanese word 駐車場newly appearing in FIG. 6 means "parking lot".

The picture includes the five areas having the image display area 401, the reproduction operation area 402, the storage section registration area 403, the list-of-storage-section display and operation area 404 and the storage execution instruction area 405 similarly to FIG. 4.

Figure 7:
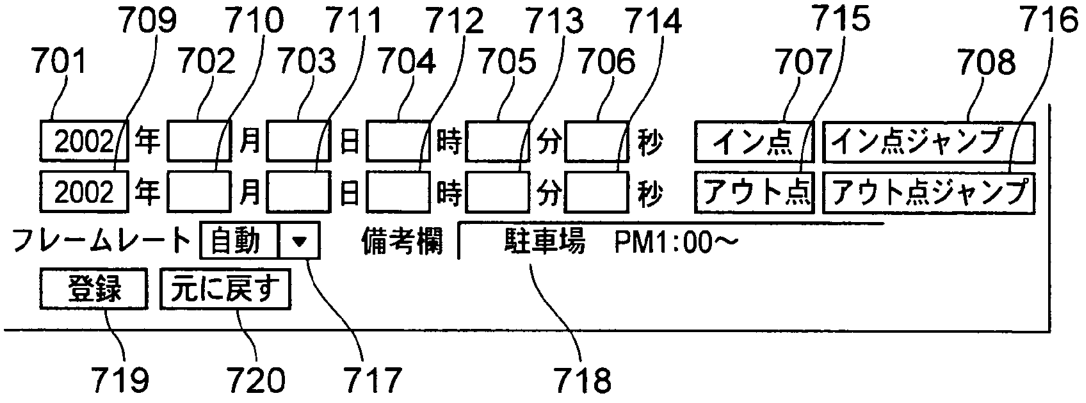
FIG. 7 is a diagram showing an embodiment of a picture displaying a storage section registration area of the present invention on an enlarged scale.

FIG. 7 is a diagram showing the storage section registration area 403 displayed on an enlarged scale of the embodiment of the present invention. Numeral 701 denotes a year-of-in-point-designation-time display column, 702 a month-of-in-point-designation-time display column, 703 a date-of-in-point-designation-time display column, 704 an hour-of-in-point-designation-time display column, 705 a minute-of-in-point-designation-time display column, 706 a second-of-in-point-designation-time display column, 707 a in-point designation button and 708 a jump-to-in-point button. The in-point represents a head or top (out-point positioned on the old side with respect to time) of the storage section. Numeral 709 denotes a year-of-out-point-designation-time display column, 710 a month-of-out-point-designation-time display column, 711 a date-of-out-point-designation-time display column, 712 an hour-of-out-point-designation-time display column, 713 a minute-of-out-point-designation-time display column, 714 a second-of-out-point-designation-time display column, 715 an out-point designation button and 716 a jump-to-out-point button. The out-point represents an end or last (out-point positioned on the new side with respect to time) of the storage section. Numeral 717 denotes a recording rate selection button, 718 a remark input column, 719 a registration button and 720 an operation back button.

In FIG. 7, the year-of-in-point-designation-time display column 701, the month-of-in-point-designation-time display column 702, the date-of-in-point-designation-time display column 703, the hour-of-in-point-designation-time display column 704, the minute-of-in-point-designation-time display column 705 and the second-of-in-point-designation-time display column 706 are a column in which time information of the image data designated as the in-point is displayed when the in-point designation button 707 is depressed.

The in-point designation button 707 is a button for issuing a command for setting the image data displayed currently in the reproduction display area 401 as the in-point of the storage section.

The jump-to-in-point button 708 is a button for issuing a command for taking out the image data designated as the in-point from the storing and delivering server 106 and thereafter entering into the stop state. This button is used to return the image data displayed in the reproduction display area 401 to the image at the in-point in a moment when the in-point is desired to be minutely adjusted again although the in-point is once designated.

The year-of-out-point-designation-time display column 709, the month-of-out-point-designation-time display column 710, the date-of-out-point-designation-time display column 711, the hour-of-out-point-designation-time display column 712, the minute-of-out-point-designation-time display column 713 and the second-of-out-point-designation-time display column 714 are a column in which time information of the image designated as the out-point is displayed when the out-point designation button 715 is depressed.

The out-point designation button 715 is a button for issuing a command for setting the image data displayed currently in the reproduction display area 401 as the out-point of the storage section.

The jump-to-out-point button 716 is a button for issuing a command for taking out the image data designated as the out-point from the storing and delivering server 106 and thereafter entering into the stop state. This button is used to return the image data displayed in the reproduction display area 401 to the image at the out-point in a moment when the out-point is desired to be minutely adjusted again although the out-point is once designated.

The designation by the in-point designation button 707 and the out-point designation button 715 is effective even during reproduction of image data and even during stop. Accordingly, the storage section can be designated while image data being reproduced is looked or watched.

The recording rate selection button 717 is a button for designating an interval of recording time of storing image data in the removable medium 109 with respect to the storage section designated by the above operation. The interval of recording time is not only selectively set by a numerical value such as, for example, 30 fps (frame per second) and 10 fps but also automatically. The automatic setting of the interval of recording time means making recording while automatically following the interval of recording time of the image data recorded in the storing and delivering server 106.

The remark input column 718 is a column for inputting remarks for the storage section designated by the above operation.

Figure 8:
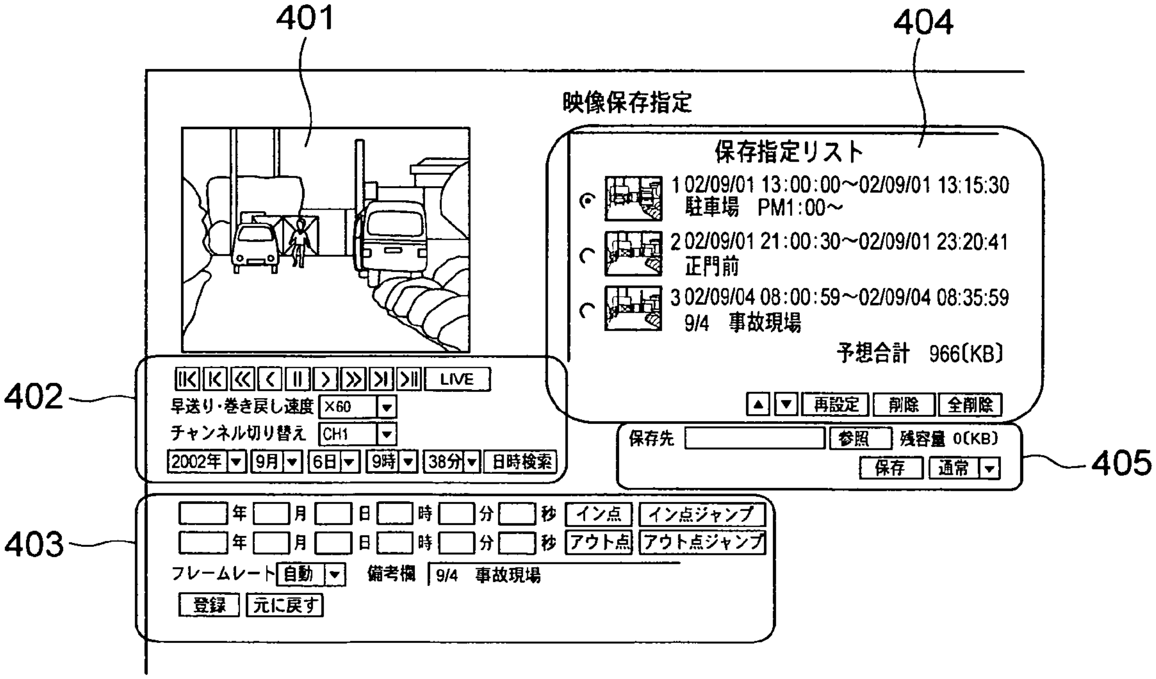
FIG. 8 is a diagram showing an embodiment of a picture displayed in the image display unit of the present invention.

The registration button 719 is a button for issuing a command for registering the storage section designated by the above operation. When the registration button 719 is depressed, the registration is made and information relative to the storage section is displayed in the list-of-storage-section display and operation area 404 as shown in FIG. 8.

The operation back button 720 is a button for issuing a command for restoring operation in the storage section registration area 403.

These buttons 707, 709 and 715 to 720 are operated to thereby make registration of the storage section even while looking the image data. The sequence of processing thereof is now described.

When any one of the button 707, 709 and 715 to 720 is operated, the contents of the operation is detected by the CPU 301. The CPU 301 performs various processing in accordance with the detected operation contents. For example, when the in-point designation button 707 is depressed, the CPU 301 takes out time information concerning the image currently displayed in the reproduction display area 401 from the memory 302 and obtains or decides contents displayed in the display columns 701 to 706 of in-point designation time from the time information to be written in the memory 302. The display contents written in the memory 302 is supplied to the image display apparatus 110 through the image output interface 304 to be displayed.

Even when the out-point designation button 715 is depressed, the same processing is performed.

Further, when the jump-to-in-point button 708, for example, is depressed, the CPU 301 takes out the contents displayed in the display columns 701 to 706 of in-point designation time from the memory 302 and transmits a request for image data corresponding to the designation time to the storing and delivering server 106 through the network interface 303 and the network medium 101. The storing and delivering server 106 receives the request and transmits the image suitable for the request to the long-term storage type recording apparatus 108 through the network medium 101. The long-term storage type recording apparatus 108 receives the image through the network interface 303 and stores it in the memory 302. The image stored in the memory 302 is sent to the image codec 405, in which the image is converted into the form that can be displayed by the image display apparatus 110 and is stored in the memory 302 again. The image data stored in the memory 302 is outputted to the image display apparatus 110 through the image output interface 304 again to be displayed in the image display area of FIG. 4. Even when the jump-to-out-point button 716 is depressed, the same processing is performed.

Further, when the recording rate selection button 717 is selectively operated, the CPU 301 writes the selected contents into the memory 302. The selected contents written in the memory 302 is outputted to the image display apparatus 110 through the image output interface 304 to be displayed.

In addition, when characters are inputted in the remark input column 718, the CPU 301 writes the inputted contents in the memory 302. The inputted contents written in the memory 302 is outputted to the image display apparatus 110 through the image output interface 304 to be displayed.

When the registration button 719 is depressed, the CPU 301 takes out at least one of the contents displayed in the display columns 701 to 706 of in-point designation time, the contents displayed in the display columns 709 to 714 of out-point designation time, the contents selected by the recording rate selection button 717 and the contents inputted in the remark input column 718 from the memory 302 to be separately written in the memory 302 as a set of storage section information. The written storage section information is outputted to the image display apparatus 110 through the image output interface 304 to be displayed in the list-of-storage-section display and operation area 404.

The editing operation such as deletion of registration and correction of registered contents in the third stage is now described in the state that the storage section is registered by the above-mentioned operation and processing sequence.

FIG. 8 is a diagram showing an example of a picture displayed in the image display apparatus 110 for explaining the editing operation of the registered storage section when the instruction interface of the long-term storage type recording apparatus 108 is provided by means of GUI in case where the long-term storage type recording apparatus 108 and the image display apparatus 110 are mounted in the form of the computer having a CRT connected thereto in the same manner as FIGS. 4 and 6. Note that the meanings of Japanese word newly appearing in the figure are as follows. 事故現場. . . the place where an accident occurred, 正門前. . . area in front of main gate, 予想合計. . . estimated total.

The picture includes the five areas having the image display area 401, the reproduction operation area 402, the storage section registration area 403, the list-of-storage-section display and operation area 404 and the storage execution instruction area 405 similarly to FIGS. 4 and 6.

Figure 9:
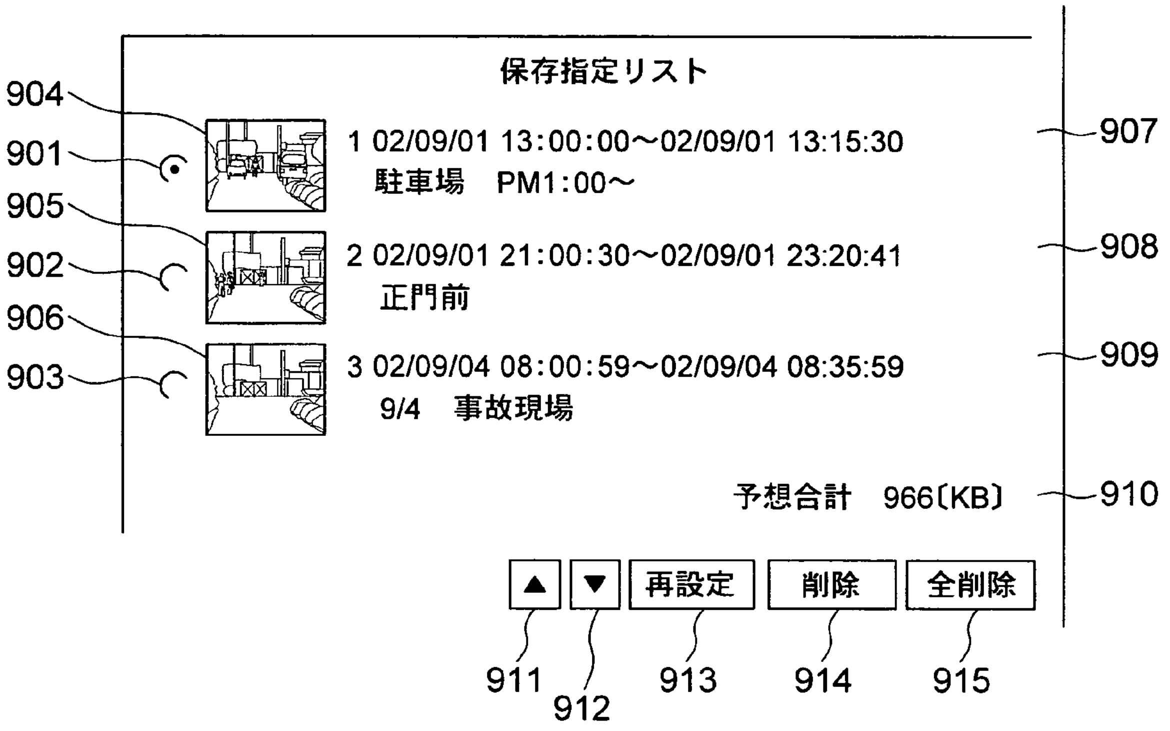
FIG. 9 is a diagram showing an embodiment of a picture displaying a list-of-storage-section display and operation area of the present invention on an enlarged scale.

FIG. 9 is a diagram showing the list-of-storage-section display and operation area 404 displayed on an enlarged scale.

FIGS. 8 and 9 shows an example of picture showing three storage sections, that is, an example of picture produced when the operation in the second stage is repeated three times.

Numerals 901 to 903 denote storage section selection buttons, 904 to 906 display columns of representative image in the storage section, 907 to 909 display columns of information for the storage section, 910 an estimated total display column, 911 an upward button, 912 a downward button, 913 a storage section reestablishment button, 914 a storage section deletion button and 915 an all-storage-section deletion button.

The storage section selection buttons 901 to 903 are buttons for selectively designating a storage section to be edited when various operation buttons 911 to 914 described later are operated. In FIG. 9, the storage section displayed uppermost is in the state designated as an object to be edited. A single or plurality of storage sections can be selectively designated by combination of keys in the input device. Further, the selected state is canceled by operation of the same button for the selected state.

The display columns 904 to 906 of representative image of storage section are columns for displaying representative image in the registered storage section. The representative image is image that expresses contents of image in the storage section visually and most directly. In FIG. 9, image at the head or top (end positioned on the old side with respect to time) of the storage section is displayed as the representative image by way of example.

The display columns 907 to 909 of information for the storage section are columns for displaying various information in the registered storage sections. The information to be displayed contains storage section number, time information at the start and out-points, character information inputted as remarks, channel number, interval of recording time and the like. In FIG. 9, the storage section number, the time information at the start and out-points and the character information inputted remarks are displayed by way of example.

The estimated total display column 910 displays a sum total estimated when all the storage sections registered are stored in the removable medium 109. This column is usually displayed by the similar color to other columns and buttons, for example, black, although when the estimated total exceeds the unoccupied amount of the removable medium 109, the column is displayed by a louder color such as, for example, red.

The upward button 911 is a button for issuing a command for moving the selectively indicated storage section upward by one. When this button 911 is depressed, the selectively indicated one or plural storage sections are replaced by the unselected storage sections positioned upward by one. If at least one of the selected storage sections is positioned uppermost, any action does not occur even when this button 911 is depressed.

The downward button 912 is a button for issuing a command for moving the selectively indicated storage section downward by one. When this button 912 is depressed, the selectively indicated one or plural storage sections are replaced by the unselected storage sections positioned downward by one. If at least one of the selectively indicated storage sections is positioned lowermost, any action does not occurs even when this button 912 is depressed.

For example, in FIG. 9, when the downward button 912 is depressed, the storage section selection button 901, the display column 904 of representative image of storage section and the display column 907 of information for storage section are replaced by the storage section selection button 902, the display column 905 of representative image of storage section and the display column 908 of information for storage section, respectively. However, the storage section numbers displayed in the display columns 907 and 908 of information for storage section are changed so that the number for the column 908 is 1 and the number for the column 907 is 2.

The storage section reestablishment button 913 is a button for issuing a command for instructing to display the time information at the start and out-points, the character information inputted as remarks and the interval of recording time of the selected storage section in the display columns 701 to 706 of in-point designation time, the display columns 709 to 714 of out-point designation time, the recording rate selection button 717 and the remark input column 718 in the storage section registration area 403. The storage section reestablishment button 913 is used when the start and out-points are desired to be adjusted since the estimated total exceeds the unoccupied amount of the removable medium 109 although the storage section is once registered in the second stage and when information is added as remarks and the like. For example, in FIG. 9, when the reestablishment button is depressed, “2002” is displayed in display column 701, “9” in display column 702, “1” in display column 703, “13” in display column 704, “00” in display column 705, “00” in display column 706, “2002” in display column 709, “9” in display column 710, “1” in display column 711, “13” in display column 712, “15” in display column 713, “30” in display column 714, “auto” in display column 717 and “near parking place 1:00 p.m.” in display column 718.

The storage section reestablishment button 913 is effective only when a single storage section is selected. When a plurality of storage sections are selected, it is regarded as invalid and no action occurs.

The storage section deletion button 914 is a button for issuing a command for deleting the selected storage section which has been already registered. In FIG. 9, when the storage section deletion button 914 is depressed, the registered storage section is deleted, so that the storage section selection button 901, the representative-image-of-storage-section display column 904 and the information-of-storage-section display column 907 are changed to the undisplayed state and the storage section displayed thereunder is advanced to the upper position by one to be displayed. At this time, the storage section numbers displayed in the information-of-storage-section display columns 908 and 909 are renumbered so that 1 is assigned to the display column 908 and 2 is assigned to the display column 909.

The all-storage-section deletion button 915 is a button for issuing a command for deleting all of the registered storage sections irrespective of selected storage sections and unselected storage sections. When this button 915 is depressed, the storage section selection buttons 901 to 903, the representative-image-of-storage-section display columns 904 to 906 and the information-of-storage-section display columns 907 to 908 are all changed to the undisplayed state and are returned to the state of the list-of-storage-section display and operation area 404 shown in FIG. 4.

When the reestablishment is made in the storage section registration area 403 which can be reestablished by the storage section reestablishment button 913, the registration button 719 is depressed again to thereby make reestablishment.

Figure 10:
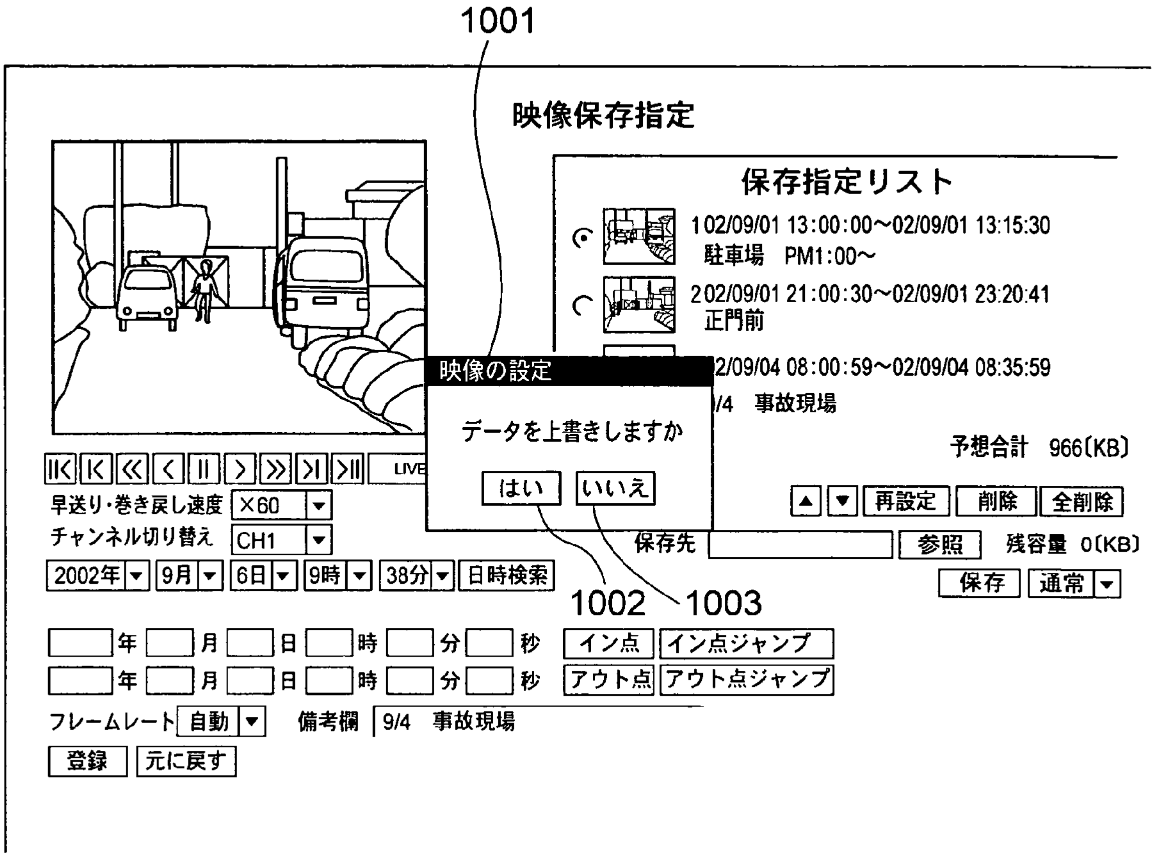
FIG. 10 is a diagram showing an embodiment of a picture displayed in the image display unit of the present invention.

FIG. 10 shows an example of a picture when the registration button 719 is depressed again. Numeral 1001 denotes an overwriting inquiry window, 1002 an overwriting permission button and 1003 an overwriting stop button. Note that the meanings of Japanese words newly appearing in the figure are as follows. 映像設定. . . setting of image, データを上書きしますか. . . data overwritten?, はい. . . yes, いいえ. . . no.

The overwriting inquiry window 1001 is displayed when the registration button 719 is depressed upon reestablishment. The overwriting permission button 1002 is a button for issuing a command for overwriting the reestablished contents on the registered storage section. The overwriting stop button 1003 is a button for issuing a command for stopping overwriting of the reestablished contents on the registered storage section.

When the overwriting permission button 1002 is depressed, the reestablished contents are overwritten on information in the storage section. When the overwriting stop button 1003 is depressed, the present operation of the registration button is regarded as invalid and the information in the storage section is nor influenced. The overwriting inquiry window 1001 is closed.

The buttons 901 to 903 and 911 to 915 are operated to thereby make editing of the registered storage sections. The processing sequence thereof is described.

When the buttons 901 to 903 and 911 to 915 are operated, its operation contents are detected by the CPU 301. The CPU 301 performs various processing in accordance with the operation contents. For example, when the storage section selection button 901 is selectively operated, the CPU 301 understands that the storage section having the storage section number of 1 is selected and writes information (selection contents) indicating that the storage section having the storage section number of 1 is selected in the memory 302. The selection contents written in the memory is outputted through the image output interface 304 to the image display apparatus 110 as a black dot indication representing that it is selected to be displayed in the image display apparatus 110. When the storage section selection buttons 902 and 903 are selected, the same processing is performed.

When the upward button 911 is depressed, the CPU 301 takes out the number information of the currently selected storage section from the memory 302 and confirms whether the number of 1 is contained in the taken-out storage section numbers or not. When it is contained, any operation is not made and processing is ended. When it is not contained, the CPU 301 replaces the storage section numbers with each other between adjacent storage sections starting in order from the storage section having the smallest number of the taken-out storage section numbers and writes the replaced numbers in the memory 302 again. This replacement is repeated for all of the taken-out storage section numbers. When it is completed, display for all the storage sections registered is outputted to the image display apparatus 110 through the image output interface 304 to be displayed again.

Even when the downward button 912 is depressed, the similar processing is made.

When the storage section reestablishment button 913 is depressed, the CPU 301 takes out the number information of the currently selected storage sections from the memory 302 and confirms whether the number of the selected storage sections is singular. When it is plural, any operation is not made and processing is ended. When it is singular, the CPU 301 takes out the time information of the start and out-points corresponding to the taken-out storage section numbers, the character information inputted as remarks and the recording time interval from the memory 302. The taken-out contents are written in the memory 302 as information of display contents for the display columns 701 to 706 of in-point designation time, the display columns 709 to 714 of out-point designation time, the recording rate selection button 717 and the remark input column 718. The display contents written in the memory 302 is outputted to the image display apparatus 110 through the image output interface 304 to be displayed.

When the storage section deletion button 914 is depressed, the CPU 301 takes out the currently selected storage section number information from the memory 302. The CPU 301 deletes the in- and out-point time information of storage sections, the character information inputted as remarks, the recording time interval and the like corresponding to the taken-out storage section numbers starting in order from the smallest storage section numbers from the memory 302. Further, the numbers themselves are also deleted.

The above operation is repeated for all of the taken-out storage section numbers. When it is completed, the storage section number is re-assigned to all of the registered storage sections left at the time that it is completed while starting in order from the storage section having the small value and information for all the registered storage sections is outputted to the image display apparatus 110 through the image output interface 304 to be displayed again.

When all-of-storage-section deletion button 915 is depressed, the CPU 301 takes out all of the registered storage section number information from the memory 302. The CPU 301 deletes the in- and out-point time information, the character information inputted as remarks, the recording time interval and the like corresponding to the taken-out storage section numbers starting in order from the smallest storage section number. When it is completed, a picture in the state having no registration is outputted to the image display apparatus 110 through the image output interface 304 to be displayed again.

Next, the operation that the image corresponding to the registered storage section in the fourth stage is stored in the removable medium 109 actually in the state that the registration of the storage sections is made by the above operation and processing sequence is described.

Figure 11:
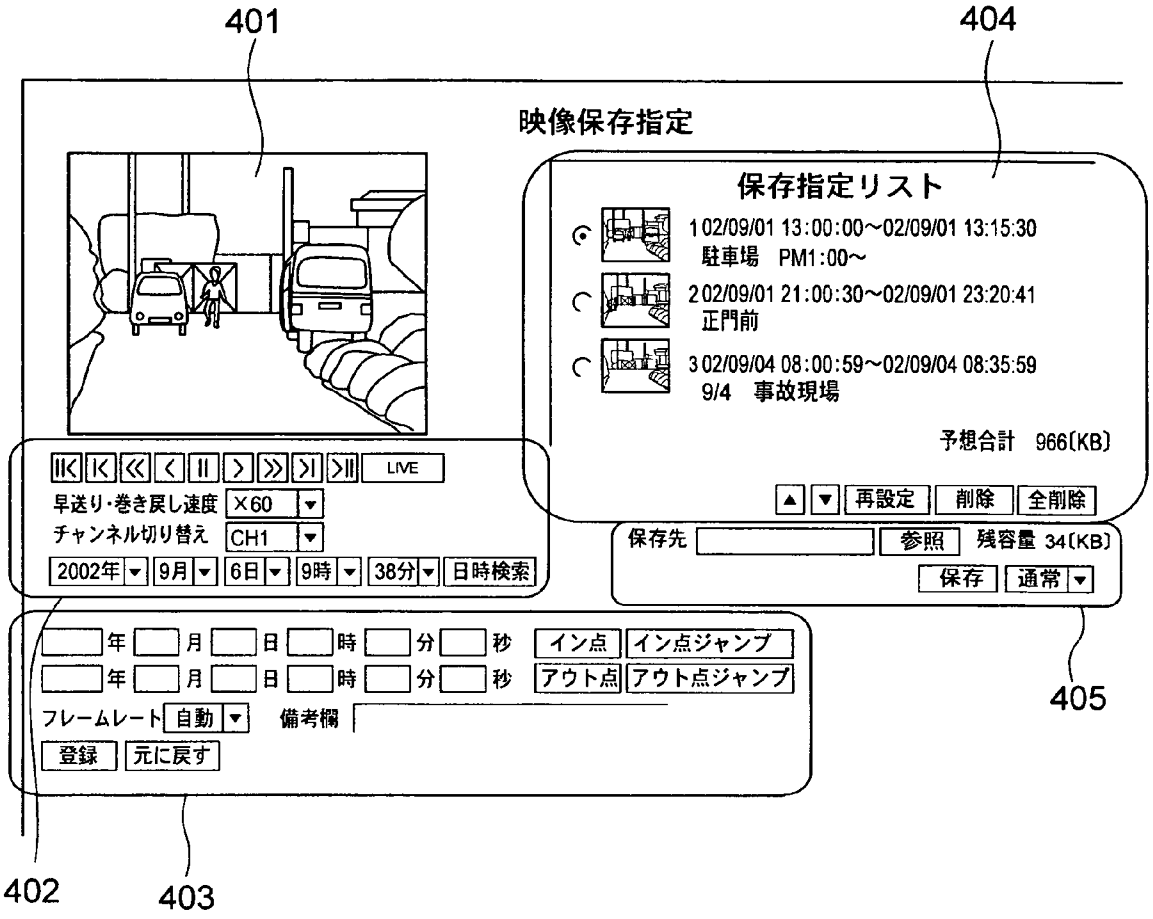
FIG. 11 is a diagram showing an embodiment of a picture displayed in the image display unit of the present invention.

FIG. 11 is a diagram showing an example of a picture displayed in the image display apparatus 110 for explaining the storage execution operation when the instruction interface of the long-term storage type recording apparatus 108 is provided by means of GUI in case where the long-term storage type recording apparatus 108 and the image display apparatus 110 are mounted in the form of the computer having a CRT connected thereto in the same manner as FIGS. 4, 6 and 8.

The picture is constituted by five areas 401 to 405 in the same manner as FIGS. 4, 6 and 8.

Figure 12:
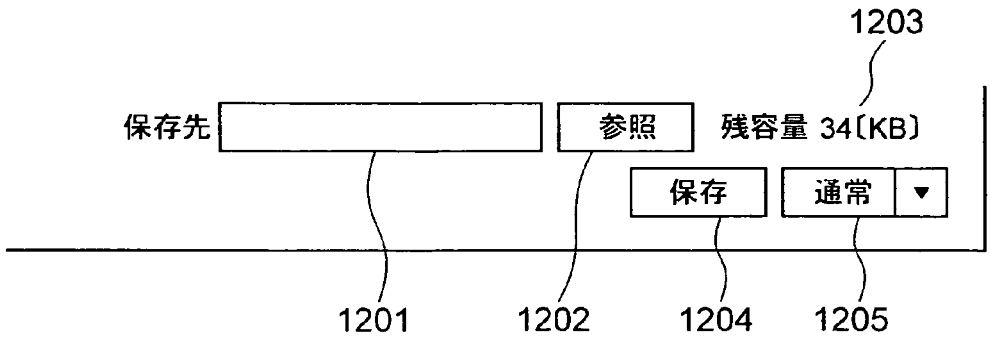
FIG. 12 is a diagram showing an embodiment of a picture displaying a storage execution instruction area of the present invention on an enlarged scale.

FIG. 12 is a diagram showing the storage execution instruction area 405 displayed on an enlarged scale. Numeral 1201 denotes a storage location display column, 1202 a storage location reference button, 1203 a remaining capacity display column, 1204 a store button and 1205 a storing speed selection button.

The storage location display column 1201 is a column in which the storage location of the image designated by the storage location reference button and taken out from the storing and delivering server 106, that is, a folder name in the removable medium is displayed.

The storage location reference button 1202 is a button for designating a folder name in the removable medium. When the storage location reference button 1202 is depressed, a list of folders is displayed and accordingly a folder is selected from the list to thereby make designation.

The remaining capacity display column 1203 is a column in which a unoccupied capacity of the removable medium 109 designated by the storage location reference button 1202 is displayed. The unoccupied capacity is obtained upon designation of the storage location by the storage location reference button 1202 to be displayed.

The store button 1204 is a button for issuing a command for executing storing to the removable medium 109. When the store button 1204 is depressed, the images corresponding to the registered storage sections, that is, the image corresponding to the storage sections displayed in the list-of-storage-section display and operation area 404 are taken out from the storing and delivering server 106 and are stored in the removable medium 109 in order of the storage section number.

The storing speed selection button 1205 is a button for designating the processing speed in the storing operation. There are “usual”, “double speed”, “triple speed” and “maximum speed” and the like as the processing speed. The “usual” means “speed of one time”, that is, it means that image is taken out at 30 fps and is stored. The “double speed” and “triple speed” mean that image is taken out at 60 and 90 fps, respectively, to be stored. The “maximum speed” means that image is taken out at the maximum speed of the system to be stored.

In this example, there are four kinds of speed, although “speed of n times” (n is an integer larger than or equal to 4) such as “quadruple speed” may be set.

Operation of these buttons 1202, 1204 and 1205 can make the storage execution operation. This processing sequence is now described.

When the button 1202, 1204 or 1205 is operated, its operation contents can be detected by the CPU 301. The CPU 301 performs various processing in accordance with its operation contents. For example, when the storage location reference button 1202 is depressed, the CPU 301 takes out a list of folder information existing in the apparatus from the memory 302 and sends the list to the image display apparatus 110 through the image output interface 304 to be displayed. When the folder desired to be stored and existing in the removable medium is selected from the displayed list, the CPU 301 writes the folder name in the memory 302 and further asks the removable medium 109 through the recording interface 306 about the unoccupied capacity of the removable medium 109 including the folder to write the acquired information in the memory 302. The information of the folder name and the unoccupied capacity written in the memory 302 is sent through the image output interface 304 to the image display apparatus 110 and displayed in the storage location display column 1201 and the remaining capacity display column 1203, respectively.

When the storing speed selection button 1205 is depressed, the CPU 301 writes its selected contents in the memory 302. The written contents are sent through the image output interface 304 to the image display apparatus 110 to be displayed.

When the store button 1204 is depressed, the CPU 301 first confirms whether the reproduction software is stored in the designated folder of the removable medium 109 or not. When it is not stored, the CPU 301 takes out the reproduction software previously stored in the memory 302 of the long-term type recording apparatus 108 and writes the software in the pertinent folder of the removable medium 109 through the recording interface 306. The reproduction software is a set of files necessary for reproduction in addition to the execution program.

The CPU 301 downloads the reproduction software stored in the storing and delivering server 106 so as to store the same in the memory 302 and reproduce the image data delivered from the storing and delivering server 106.

The removable medium stores the reproduction software as described above. Accordingly, the reproduction software stored in the removable medium can be reproduced by any image reproduction apparatus. In other words, the image reproduction apparatus receives the reproduction software in the removable medium storing the image data stored in the reproduction software in the upload manner so as to be able to reproduce the image data to thereby make it possible to reproduce it. When the capacity of the data file is reduced, the reproduction software can be fitted to transmission of a network and storage. As the compression method of the data file, there are, for example, the known LZH form, the ZIP system and the Cab form.

When the reproduction software is stored in the folder of the removable medium 109, the CPU 301 takes out all information of the registered storage sections, that is, all information concerning the storage sections displayed in the list-of-storage-section display and operation area 404 from the memory 302. The CPU 301 uses the time information of start and out-points, the channel number and the recording time interval from the taken-out storage section information and calculates or prepares an image request to the storing and delivering server 106 to be transmitted to the storing and delivering server 106 through the network interface 303 and the network medium 101.

The storing and delivering server 106 receives the image request and transmits the image suitable for the request to the long-term storage type recording apparatus 108 through the network medium 101. The long-term storage type recording apparatus 108 receives the image data through the network interface 303 and stores it in the memory 302. The image stored in the memory 302 is stored in the removable medium 109 through the recording interface 306.

The processing sequence is repeated frame by frame in order of the small storage section number between the storage sections and from the in-point toward the out-point within the storage section to thereby store all of the registered storage section images.

Further, the progress state during the storage processing is calculated as a ratio (percentage) of the stored frames at present to all frames to be stored for each frame while its result is always written in the memory 302. The progress state contents written in the memory 302 are sent to the image display apparatus 110 through the image output interface 304 and displayed as shown in FIG. 13 described later.

Figure 13:
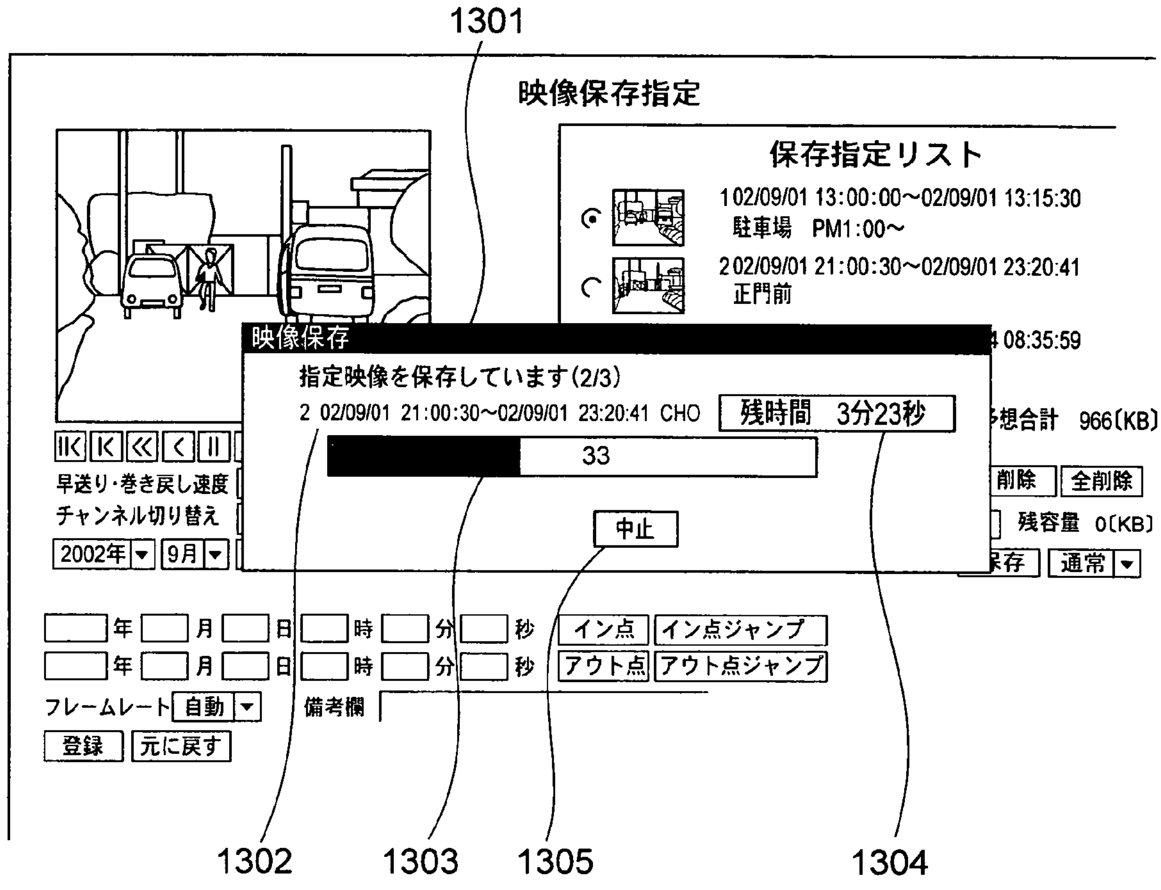
FIG. 13 is a diagram showing an embodiment of a picture displayed in the image display apparatus of the present invention.

FIG. 13 shows an example of a picture in case where the storage processing is being executed by depression of the store button 1204. Numeral 1301 a progress state display window, 1302 a progress state character display column, 1303 a progress state bar display column, 1304 an estimated remaining time display column and 1305 a storage stop button. Note that the meanings of Japanese words newly appearing in the figure are as follows. 映像保存. . . store image, 指定映像を保存しています ... designated image being stored, 残時間3分２３秒. . . remaining time 3 min. 23 sec., 中止 ... stop.

The progress state display window is displayed when the store button 1204 is depressed.

The progress state character display column 1302 is a column in which the progress state of the storage processing is displayed in character. The number of the storage section being processed currently and the time information of the start and out-points of the storage section are displayed in the column 1302.

The progress state bar display column 1303 is a column in which the progress state of the storage processing is displayed by a percentage bar. The ratio of the stored frames at present to all frames to be stored is displayed by the bar.

The estimated remaining time display column 1304 is a column in which an estimated time required for the remaining storage processing is displayed. The estimated remaining storage processing time is calculated from the ratio of the completed storage processing and the processing time actually required from the beginning of the processing to the present time.

The storage stop button 1305 is a button for issuing a stop command of the storage processing. When the storage stop button 1305 is depressed, the storage processing is stopped and ended so that the image stored so far is effective.

Figure 25:
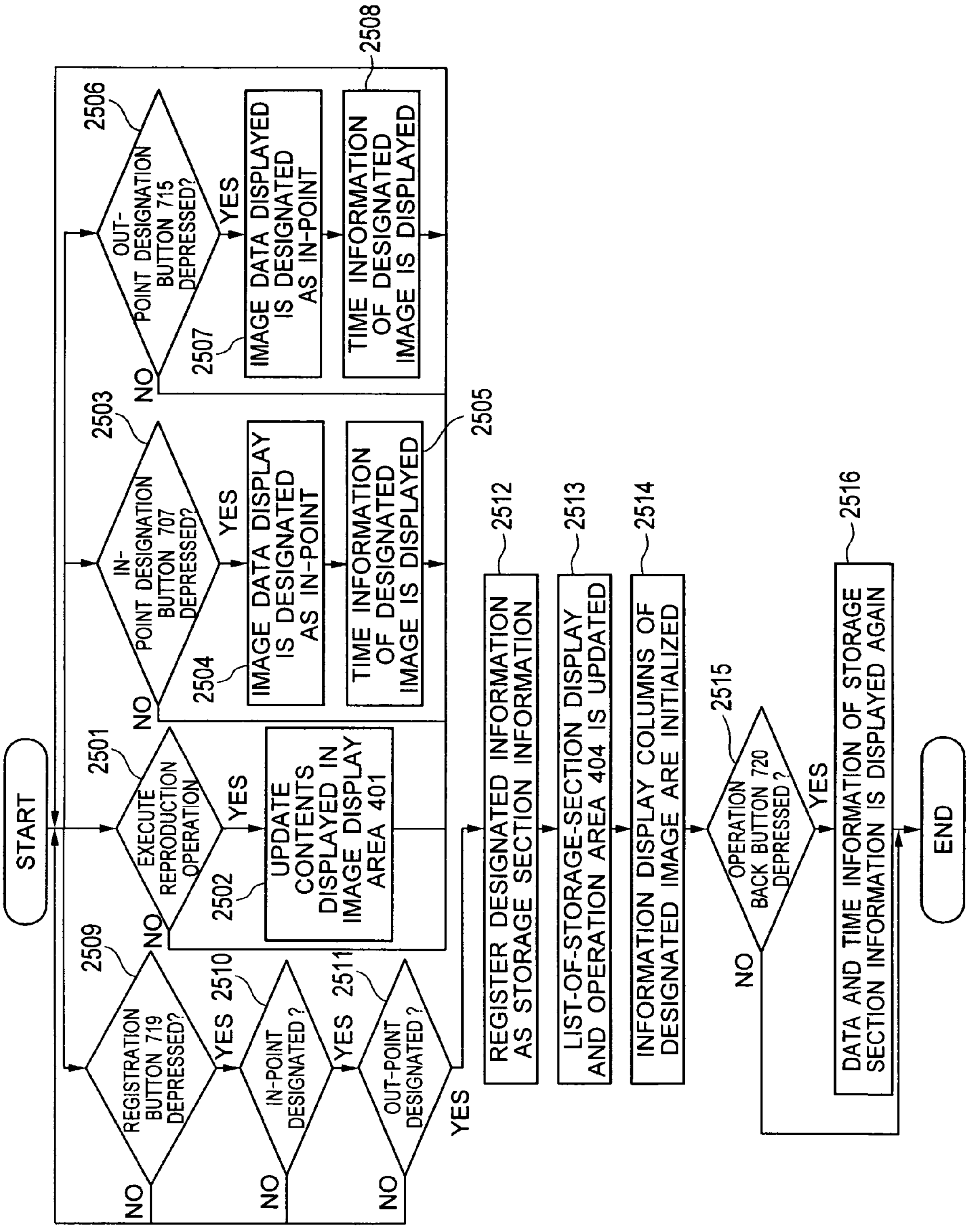
FIG. 25 is a flow chart showing processing for registering storage section information.

FIG. 25 is a flow chart showing the processing for registering the storage section information for realizing the above method.

In step 2501, any of the buttons 501 to 518 of the image operation area and the buttons 708 and 716 of the storage section designation area is depressed to judge whether the reproduction operation is to be executed or not. When any of the buttons is depressed, the processing proceeds to step 2502, in which the reproduction processing is executed in accordance with the depressed button and contents displayed in the image display area 401 are updated.

In step 2503, it is judged whether the in-point designation button 707 is depressed or not. When it is depressed, the processing proceeds to step 2504. In step 2504, the image data displayed in the image display area 401 is designated as the in-point. In step 2505, the time information of the image data designated as the in-point is displayed in the pertinent portion of the storage section registration area 403.

In step 2506, it is judged whether the out-point designation button is depressed or not. When it is depressed, the processing proceeds to step 2507. In step 2507, the image data displayed in the image display area 401 is designated as the out-point. In step 2508, the time information of the image data designated as the out-point is displayed in the pertinent portion of the storage section registration area 403.

In step 2509, it is judged whether the registration button 719 is depressed or not. When it is depressed, the processing proceeds to step 2510. In step 2510, it is judged whether the in-point is designated or not. When it is designated, the processing proceeds to step 2511. In step 2511, it is judged whether the out-point is designated or not. When it is designated, the processing proceeds to step 2512. In step 2512, the designated information is registered as the storage section information. In step 2513, the list-of-storage-section display and operation area 404 is updated by the registered storage section information. In step 2514, the columns of the storage section registration area are initialized. In step 2515, it is judged whether the operation back button 720 is depressed or not. When it is depressed, the processing proceeds to step 2516. In step 2516, the data and time information of the storage section information registered in step 2512 is displayed in the storage section registration area again.

Figure 26:
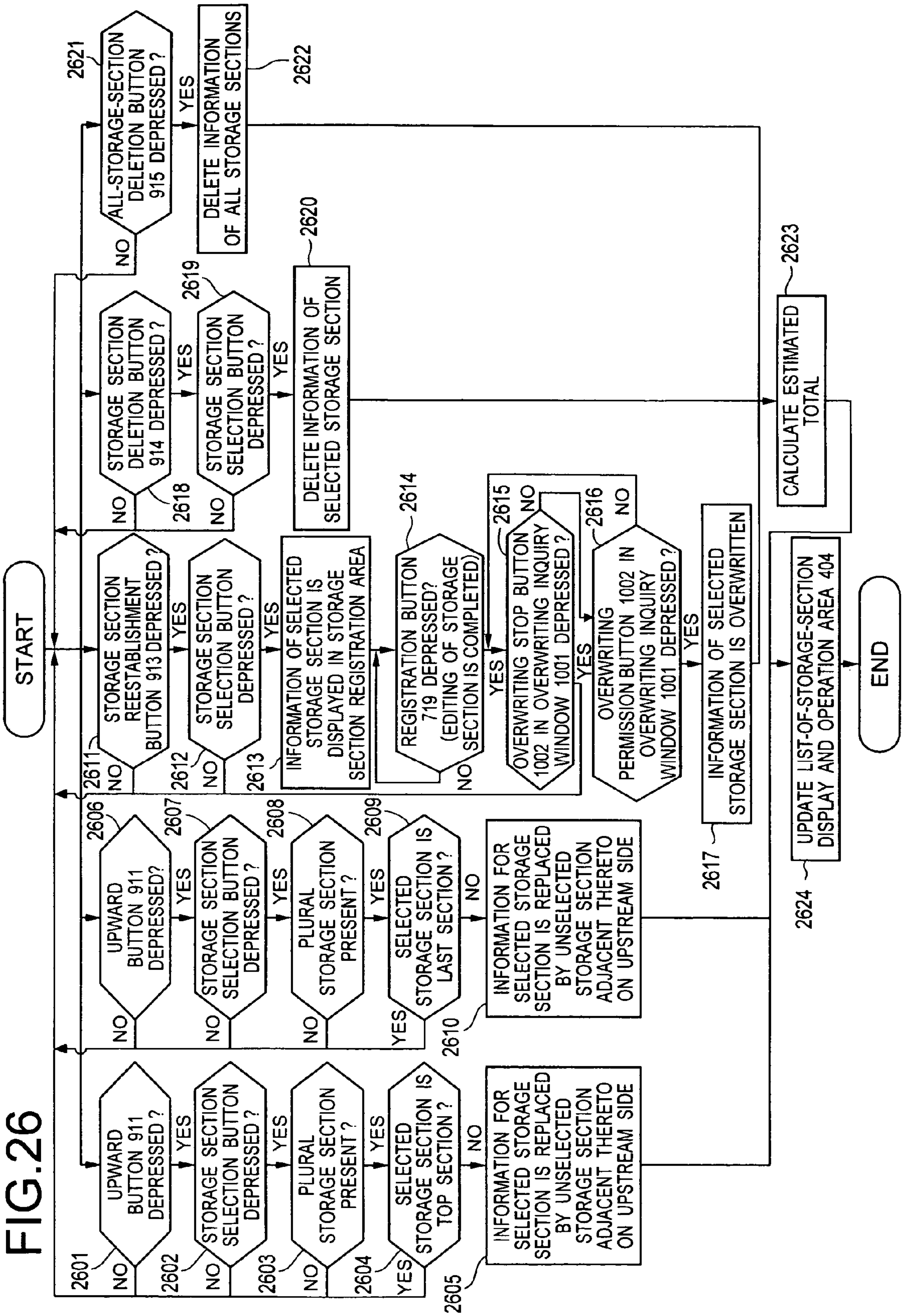
FIG. 26 is a flow chart showing processing for editing storage section information.

FIG. 26 is a flow chart showing the processing for editing the storage section information for realizing the above method.

In step 2601, it is judged whether the upward button 911 is depressed or not. When it is depressed, the processing proceeds to step 2602. In step 2602, it is judged whether the storage section selection button is depressed or not. When it is depressed, the processing proceeds to step 2603. In step 2603, it is judged whether there are a plurality of storage sections or not. When there are the plurality of storage sections, the processing proceeds to step 2604. In step 2604, it is judged whether the storage section selected by the storage section selection button is the storage section at the head or not. When it is not, the processing proceeds to step 2605. In step 2605, information of the selected storage section is replaced by information of the unselected storage section positioned adjacent thereto on the upstream side. In step 2624, contents displayed in the list-of-storage-section display and operation area 404 are updated on the basis of the information replaced in step 2605.

In step 2606, it is judged whether the downward button 912 is depressed or not. When it is depressed, the processing proceeds to step 2607. In step 2607, it is judged whether the storage section selection button is depressed or not. When it is depressed, the processing proceeds to step 2608. In step 2608, it is judged whether there are a plurality of storage sections or not. When there are the plurality of storage sections, the processing proceeds to step 2609. In step 2609, it is judged whether the storage section selected by the storage section selection button is the storage section at the end or not. When it is not, the processing proceeds to step 2610. In step 2610, information of the selected storage section is replaced by information of the unselected storage section positioned adjacent thereto on the downstream side. Contents displayed in the list-of-storage-section display and operation area 404 are updated on the basis of the information replaced in step 2610.

In step 2611, it is judged whether the storage section reestablishment button 913 is depressed or not. When it is depressed, the processing proceeds to step 2612. In step 2612, it is judged whether the storage section selection button is depressed or not. When it is depressed, the processing proceeds to step 2613. In step 2613, information of the storage section selected by the storage section selection button is displayed in the storage section registration area 403. In step 2614, it is judged whether the registration button 719 is depressed after editing of the storage section or not and when it is depressed, the processing proceeds to step 2615. In step 2615, it is judged whether the overwriting stop button in the overwriting inquiry window 1001 is depressed or not and when it is depressed, reestablishment of the storage section is invalid. When it is not depressed, the processing proceeds to step 2616. In step 2616, it is judged whether the overwriting permission button 1002 in the overwriting inquiry window 1001 is depressed or not and when it is depressed, the processing proceeds to step 2617. In step 2617, information of the storage section selected by the storage section selection button is overwritten on the edited information of the storage section. In step 2623, the capacity in case where all the registered storage sections are stored in the medium is calculated. In step 2624, contents displayed in the list-of-storage-section display and operation area 404 are updated on the basis of the information overwritten in step 2617.

In step 2618, it is judged whether the storage section deletion button 914 is depressed or not and when it is depressed, the processing proceeds to step 2619. In step 2619, it is judged whether the storage section selection button is depressed or not and when it is depressed, the processing proceeds to step 2620. In step 2620, the information of the storage section selected by the storage section selection button is deleted. In step 2623, the capacity in case where all the registered storage sections are stored in the medium is calculated. In step 2624, contents displayed in the list-of-storage-section display and operation area 404 are updated on the basis of the information deleted in step 2620.

In step 2621, it is judged whether the all-storage-section deletion button 915 is depressed or not and when it is depressed, the processing proceeds to step 2622. In step 2622, information of all the storage sections is deleted. In step 2623, the capacity in case where all the registered storage sections are stored in the medium is calculated. In step 2624, contents displayed in the list-of-storage-section display and operation area 404 are updated on the basis of the information deleted in step 2622.

Figure 27:
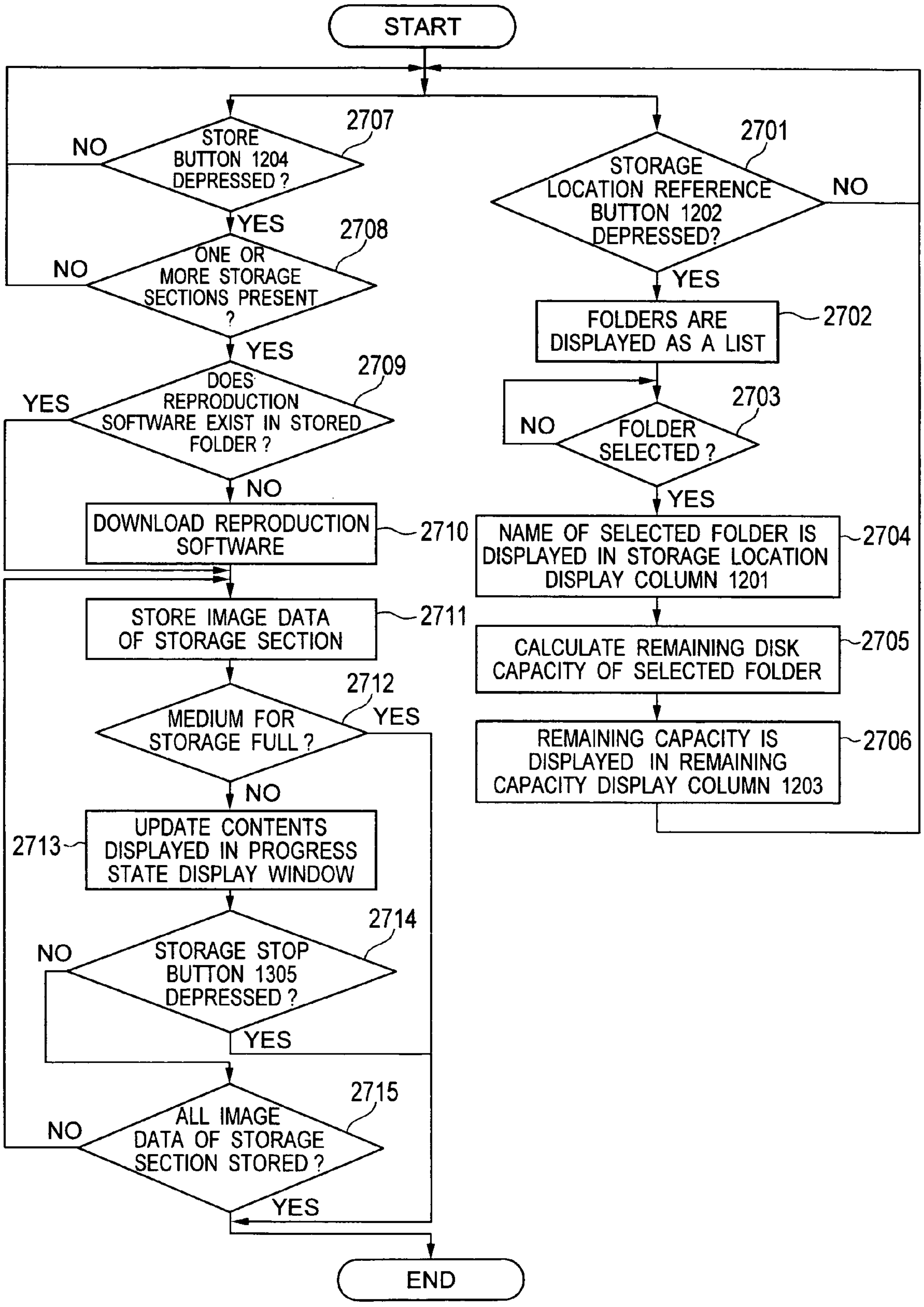
FIG. 27 is a flow chart showing processing for storing image corresponding to the storage section in a recording medium.

FIG. 27 is a flow chart showing the processing for storing image corresponding to the storage section in the medium for realizing the above method.

In step 2701, it is judged whether the storage location reference button 1202 is depressed or not and when it is depressed, the processing proceeds to step 2702. In step 2702, folders stored in the medium are displayed as a list. In step 2703, it is judged whether one folder is selected from the folders displayed as the list or not and when it is selected, the processing proceeds to step 2704. In step 2704, the name of the folder selected in step 2703 is displayed in the storage location display column 1201. In step 2705, the remaining disk capacity of the selected folder is calculated. In step 2706, the remaining capacity calculated in step 2705 is displayed in the remaining capacity display column 1203.

In step 2707, it is judged whether the store button 1204 is depressed and when it is depressed, the processing proceeds to step 2708. In step 2708, it is judged whether one or more storage sections are present or not and when one or more storage sections are present, the processing proceeds to step 2709. In step 2709, it is judged whether the reproduction software exists in the folder or not and when it does not exist, the processing proceeds to step 2710 and the reproduction software is downloaded to the folder. In step 2711, the image data of the storage section is stored. In step 2712, it is judged whether the medium for storage is full or not and when it is not full, the processing proceeds to step 2713. When it is full, storing operation is stopped and the storage processing is ended. In step 2713, contents displayed in the progress state display window are updated. In step 2714, it is judged whether the storage stop button 1305 of the progress state display window 1301 is depressed and when it is depressed, the storing operation is stopped and the storage processing is ended. When it is not depressed, the processing proceeds to step 2715. In step 2715, it is judged whether all image data of the storage section is stored or not and when it is not stored, the processing is returned to step 2711 to continue to store the image data. When it is stored, the storage processing is ended.

The sequence of executing the image storage and reproduction software from the long-term storage type recording apparatus 108 in the image data storage system of FIG. 1 is now described as another embodiment of the image data storage method according to the present invention.

First of all, a starting file of the storing and delivering server 106 is opened from the long-term storage type recording apparatus 108 through the network medium 101. The image storage and reproduction software is stored in the long-term storage type recording apparatus 108 in accordance with the contents described in the opened starting file. Otherwise, the long-term storage type recording apparatus 108 is searched from the storing and delivering server 106 through the network medium automatically. As a result of the search, when the image storage and reproduction software is not stored in the long-term storage type recording apparatus 108, original software is downloaded from the storing and delivering server 106 through the network medium 101 to the long-term storage type recording apparatus 108 automatically in accordance with description of the storage location of the original software in the starting file and is stored in the long-term storage type recording apparatus 108 by making development and installation. The image storage and reproduction software stored in the long-term storage type recording apparatus 108 from the storing and delivering server 106 through the network medium 101 is automatically started in accordance with contents described in the starting file.

When image is stored in the removable medium or the like from a picture of the image storage and reproduction software of the long-term storage type recording apparatus 108, it is first confirmed that the image storage and reproduction software is stored in the designated removable medium. When it is not stored, the image storage and reproduction software stored in the long-term storage type recording apparatus 108 is copied to the pertinent folder of the removable medium.

The foregoing is the description of the execution system of the image storage and reproduction software in the image data storage system shown in FIG. 1.

Next, the reproduction method of the stored image recorded by the above system of the present invention is described.

Figure 14:
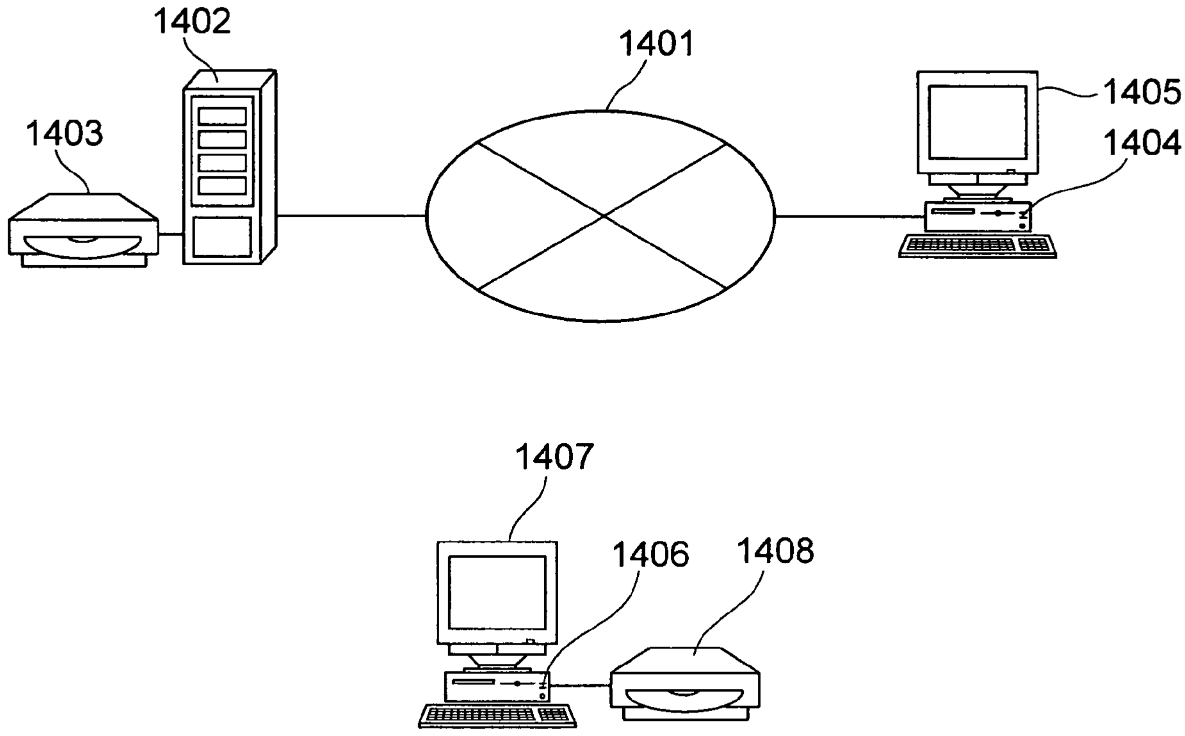
FIG. 14 is a block diagram schematically illustrating an embodiment of a system for reproducing stored image of the present invention.

FIG. 14 is a block diagram schematically illustrating an embodiment of the system for reproducing the stored image in the present invention. Numeral 1401 denotes a network medium, 1402 a Web server, 1403 a removable medium, 1404 a network type stored image reproduction apparatus, 1405 an image display apparatus, 1406 a stand-alone type stored image reproduction apparatus, 1407 an image display apparatus and 1408 a removable medium.

The network medium 1401 is, for example, network cable, radio LAN, public network or the like and has the function of transmitting data produced. Further, the network medium contains network apparatuses such as routers and hubs.

The network medium 1401 may be common to the network medium 101 of FIG. 1 or may be connected to the network medium 101 of FIG. 1 or may be a separate network disconnected from the network medium 101 of FIG. 1.

The Web server 1402 and the network type stored image reproduction apparatus 1404 are connected to the network medium 1401 and can communicate with each other.

The Web server 1402 is a personal computer (PC) including a network interface and an interface to a recording medium, for example, and delivers data stored as Web contents in the Web server 1402 through the network medium 101 in response to a request from the outside of the server.

The removable media 1403 and 1408 are the same as the removable medium 109 of FIG. 1, in which image data is stored by the image data storage system.

The connection between the Web server 1402 and the removable medium 1403 is the same as the case of FIG. 1.

The network type stored image reproduction apparatus 1404 is a decoder apparatus including a network interface, an image codec and an interface for outputting image to the image display apparatus 1405, for example. The network type stored image reproduction apparatus 1404 receives image transmitted through the network medium 1401 and converts it into a form that can be displayed by the image display apparatus 1405 to be outputted. For example, when the image display apparatus 1405 is a television monitor, the image is subjected to analog conversion. Further, when the received image is compressed image, the image is subjected to expansion processing by means of the image codec.

The image display apparatuses 1405 and 1407 are the same as the image display apparatus 105 of FIG. 1.

The stand-alone type stored image reproduction apparatus 1406 is a decoder apparatus including an image codec, an interface for outputting image to the image display apparatus 1407 and a recording interface to the removable medium 1408, for example. The stand-alone type stored image reproduction apparatus 1406 reads out image from the removable medium 1408 through the recording interface and converts it into a form that can be displayed by the image display apparatus 1407 to be outputted. For example, when the image display apparatus 1407 is a television monitor, the image is subjected to analog conversion. Further, when the received image is compressed image, the image is subjected to expansion processing by means of the image codec. The standalone type stored image reproduction apparatus 1406 is of the stand-alone type since the network medium 1401 is not used upon reproduction of image, although the apparatus 1406 may include a network interface and be connected to the network medium 1401 as far as it is not used.

The network type stored image reproduction apparatus 1404 and the stand-alone type stored image reproduction apparatus 1406 may be both combined with the image display apparatus 1405 to be formed into a single apparatus. For example, there are a form included in a television monitor, a form of a computer having a CRT connected thereto or a form of a portable terminal such as a portable telephone equipped with a display device.

Further, the network type stored image reproduction apparatus 1404 and the stand-alone type stored image reproduction apparatus 1406 also include an operation interface for issuing reproduction command such as reproduction and fast-forwarding. The interface may be GUI on a computer picture or a control panel terminal connected thereto, for example.

The connection between the stand-alone type stored image reproduction apparatus 1406 and the removable medium 1408 is also the same as the case of FIG. 1.

Figure 15:
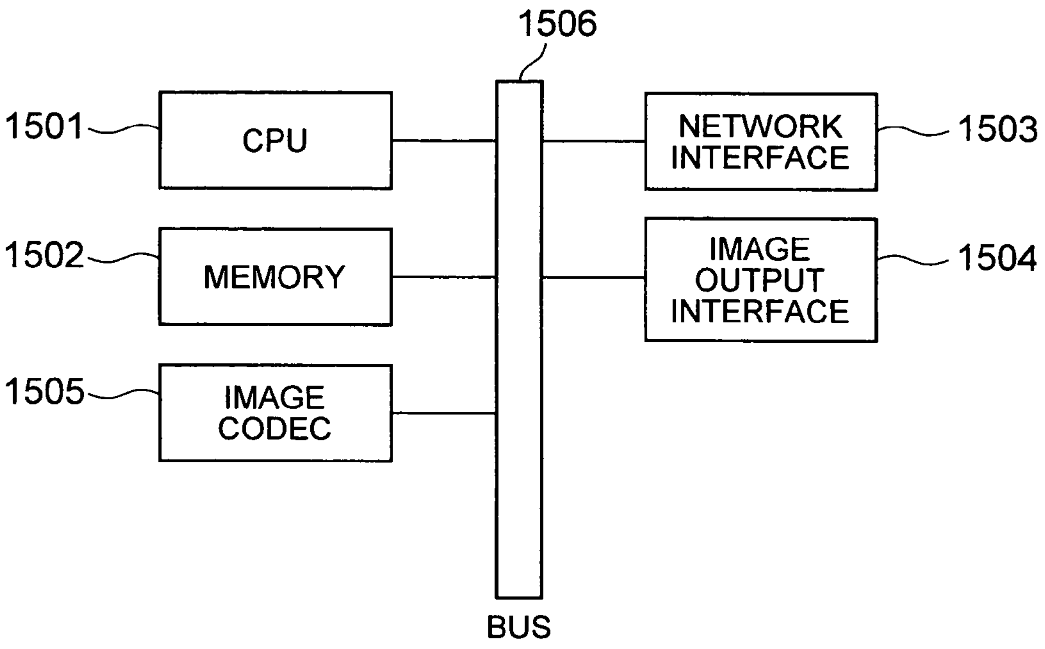
FIG. 15 is a block diagram illustrating the internal configuration of a network type stored image reproduction apparatus according to an embodiment of the present invention.

FIG. 15 is a block diagram illustrating the internal configuration of the network type stored image reproduction apparatus 1404. Numeral 1501 denotes a CPU, 1502 a memory, 1503 a network interface, 1504 an image output interface, 1505 an image codec and 1506 a bus.

The CPU 1501, the memory 1502, the network interface 1503, the image output interface 1504 and the image coded 1505 are connected to the bus 1506 and the memory 1502, the network interface 1503, the image output interface 1504 and the image codec 1505 are controlled by signals from the CPU 1501 through the bus 1506.

Figure 16:
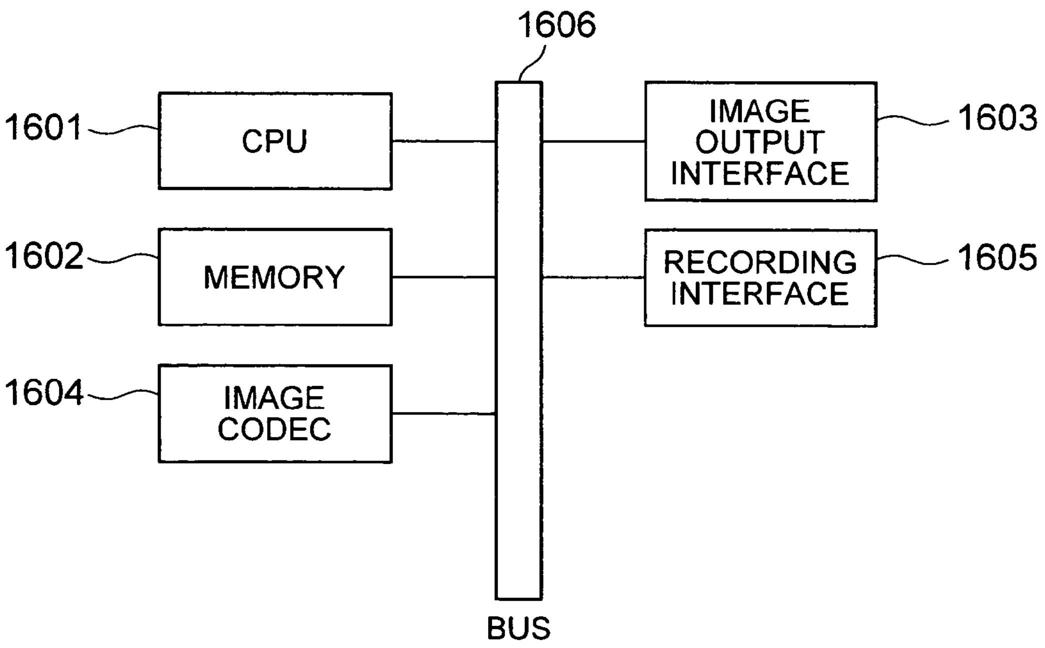
FIG. 16 is a block diagram illustrating the internal configuration of a stand-alone type stored image reproduction apparatus according to an embodiment of the present invention.

FIG. 16 is a block diagram illustrating the internal configuration of the stand-alone type stored image reproduction apparatus 1406. Numeral 1601 denotes a CPU, 1602 a memory, 1603 an image output interface, 1604 an image codec, 1605 a recording interface and 1606 a bus. The CPU 1601, the memory 1602, the image output interface 1603, the image codec 1604 and the recording interface 1605 are connected to the bus 1606 and the memory 1602, the image output interface 1603, the image coded 1604 and the recording interface 1605 are controlled by signals from the CPU 1601.

An embodiment of the stored image reproduction method of the present invention is now described with reference to FIG. 14 and picture examples shown in FIGS. 17 to 22.

Reproduction is realized by operating the Web browser as a base and operating the reproduction software in superposition manner on the Web browser. In the stand-alone type, the starting file (described later) stored in the removable medium 1408 upon storage of image is opened by the Web browser (refer to local file) to thereby move to an initial picture. In the network type, the Web server is set so that the folder contained in the removable medium 1403 is made to a shared directory (with network) and the Web browser refers to the starting file in the folder through the Web server by means of URL (Uniform Resource Locator) to thereby move to the initial picture.

Both of the network type and the stand-alone type are merely different in the system configuration and the first operation leading to the initial picture and the subsequent operation is the quite same. User can made operation without consciousness of difference between the network type and the stand-alone type.

Figure 17:
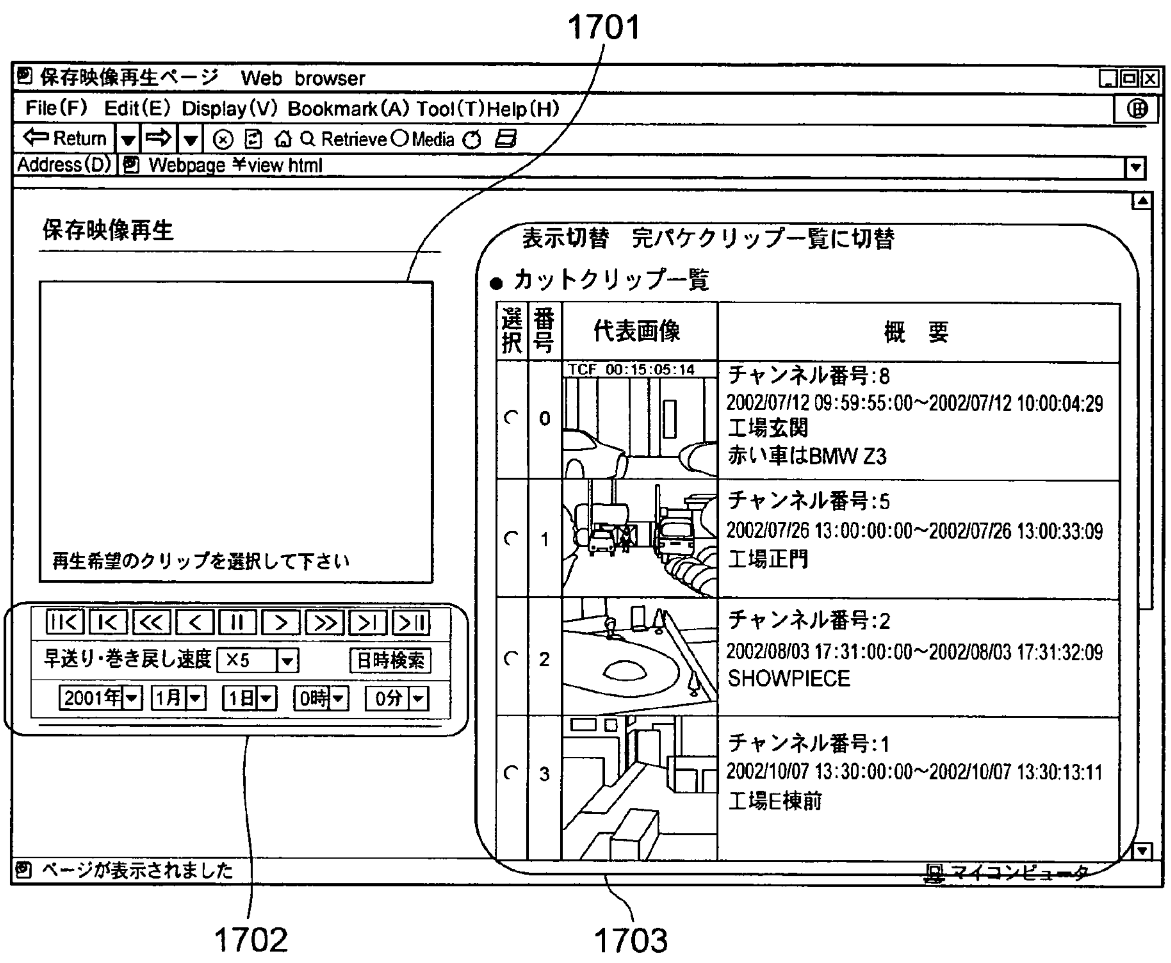
FIG. 17 is a diagram showing an embodiment of a picture displayed in the image display unit of the present invention.

FIG. 17 shows an example of an initial picture for reproduction of stored image displayed in the image display apparatuses 1405 and 1407. Note that the meanings of Japanese words newly appearing in the figure are as follows. 保存映像再生頁. . . stored image reproduction page, 保存映像再生. . . stored image reproduction, 再生希望のクリップを選択して下さい. . . select clip desired to be reproduced, ページが表示されました. . . page is displayed, 表示切替 完パケクリップ一覧に切替. . . change display, change to list of complete package clips, カットクリップ一覧. . . list of cut clip, 選択. . . select, 番号. . . number, 代表画像. . . representative image, チャンネル番号. . . channel number, 工場玄関. . . entrance of factory, 赤い車はBMW Z3 . . . red car is BMW Z3, 工場正門. . . main gate of factory, 工場E棟前. . . area in front of E building of factory, マイコンピュータ. . . microcomputer, 概要. . . note.

The picture is composed of three areas including a reproduced image display area 1701, a reproduction operation area 1702 and a list-of-image display area 1703.

The reproduced image display area 1701 is an area in which image stored in the removable medium 1403 or 1408 is displayed.

The reproduction operation area 1702 is an area in which buttons for issuing reproduction command are arranged.

The list-of-image display area 1703 is an area in which a list of images stored in the removable medium is displayed.

Figure 18:
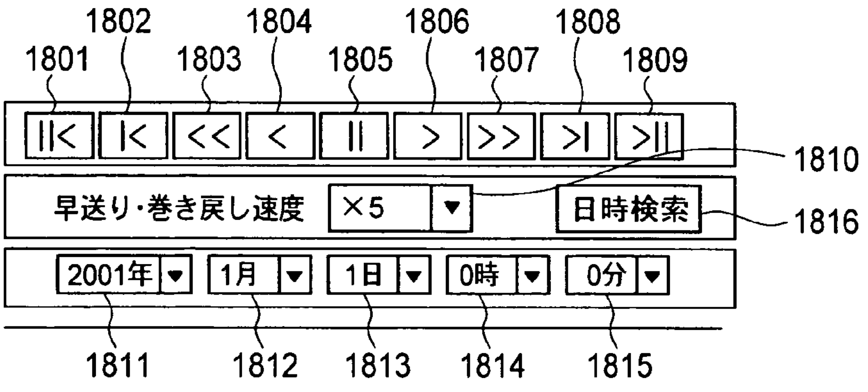
FIG. 18 is a diagram showing an embodiment of a picture displaying a reproduction operation area of the present invention on an enlarged scale.

FIG. 18 shows the reproduction operation area of an embodiment of the present invention on an enlarged scale. Numeral 1801 denotes a jump-to-top-image button, 1802 a frame back button, 1803 a rewind button, 1804 a backward reproduction button, 1805 a stop button, 1806 a forward reproduction button 1807 a frame forwarding button, 1808 a fast-forwarding button, 1809 a jump-to-last-image button, 1810 a fast-forwarding/rewinding speed designation and selection button, 1811 a year selection button, 1812 a month selection button, 1813 a date selection button, 1814 an hour selection button, 1815 a minute selection button and 1816 a date retrieval button. These buttons have the same functions as those of FIG. 5. In FIG. 5, channel image on the storing and delivering server is to be reproduced while in FIG. 18 image stored in the removable medium is to be reproduced.

Figure 19:
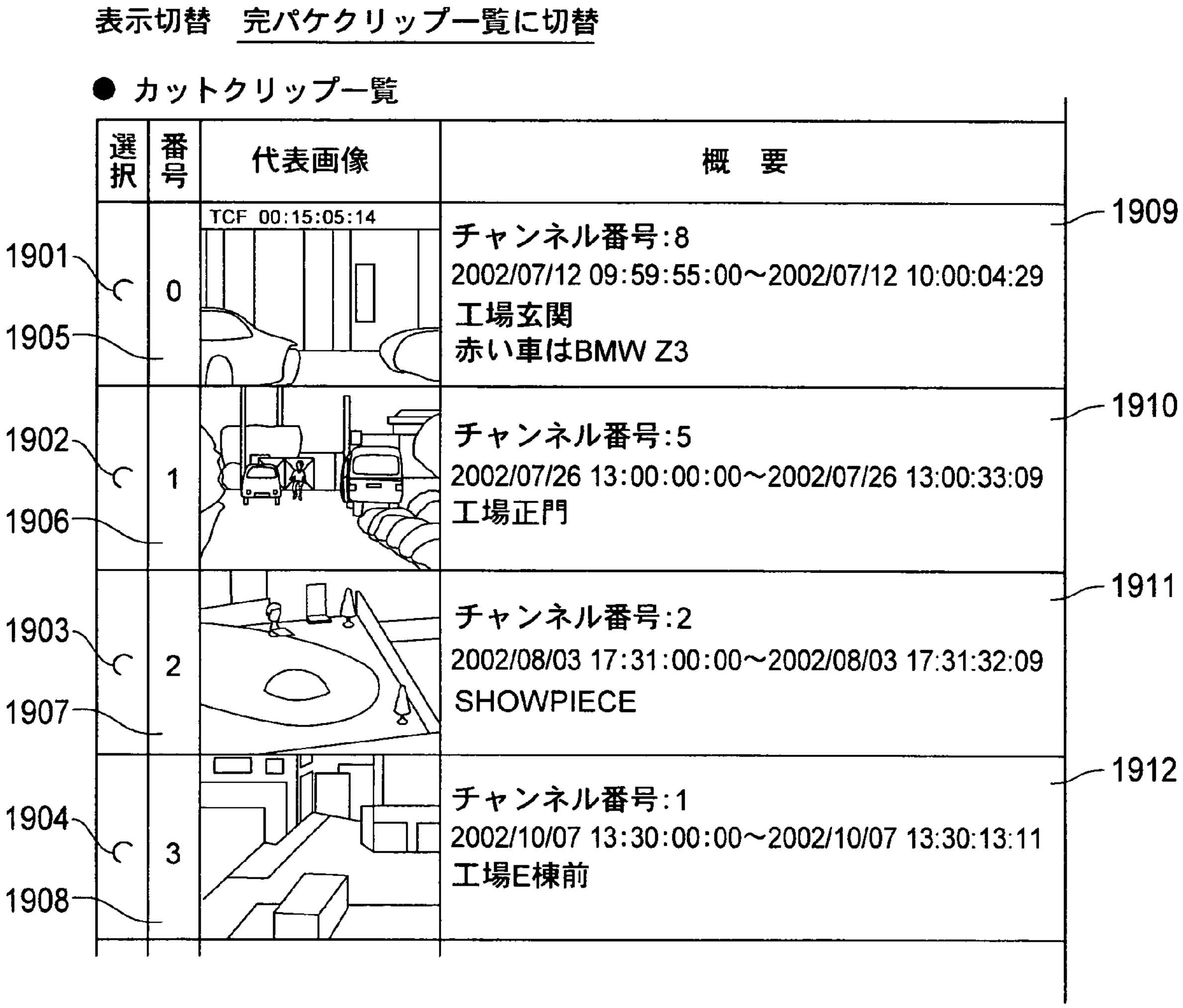
FIG. 19 is a diagram showing an embodiment of a picture displaying a list-of-image display area of FIG. 17 on an enlarged scale.

FIG. 19 shows the list-of-image display area 1703 of an embodiment of the present invention on an enlarged scale. In FIG. 19, seven images are stored in the removable medium and four images of them are displayed on one picture, by way of example. Remaining three images are to be displayed by scroll operation.

Numerals 1901 to 1904 denote image selection buttons, 1905 to 1908 representative image display columns, 1909 to 1912 various information display columns and 1913 a mode change button.

The image selection buttons 1901 to 1904 are buttons for issuing a command for selecting image desired to be reproduced. These buttons can be depressed to thereby decide image to be reproduced and the button arranged in the reproduction operation area 1702 can be depressed to thereby reproduce the image.

In this example, when the image selection button 1901 to 1904 is depressed, only one image is selected, although a plurality of reproduced image display areas can be provided to thereby select a plurality of images.

The representative image display columns 1905 to 1908 are columns in which representative image of respective images is displayed. The various information display column 1909 to 1912 are columns in which related information to each image, that is, channel number designated upon storage, remarks, time at start and out-points and the like is displayed.

In this manner, images stored in the removable medium 1403 can be understood by means of the list-of-image display area 1703 at a glance.

The mode change button 1913 is a button for issuing a command for changing image to be reproduced in each unit. In FIG. 17, image having the start and out-points designated upon storage as both ends, that is, image in the storage section is displayed and processed in a unit, although the mode change button 1913 is depressed to thereby display and process image while using image data for each execution of storing upon storage (hereinafter referred to as storage execution image) as a unit. The mode change button can be re-depressed to thereby make change between both the modes.

Figure 20:
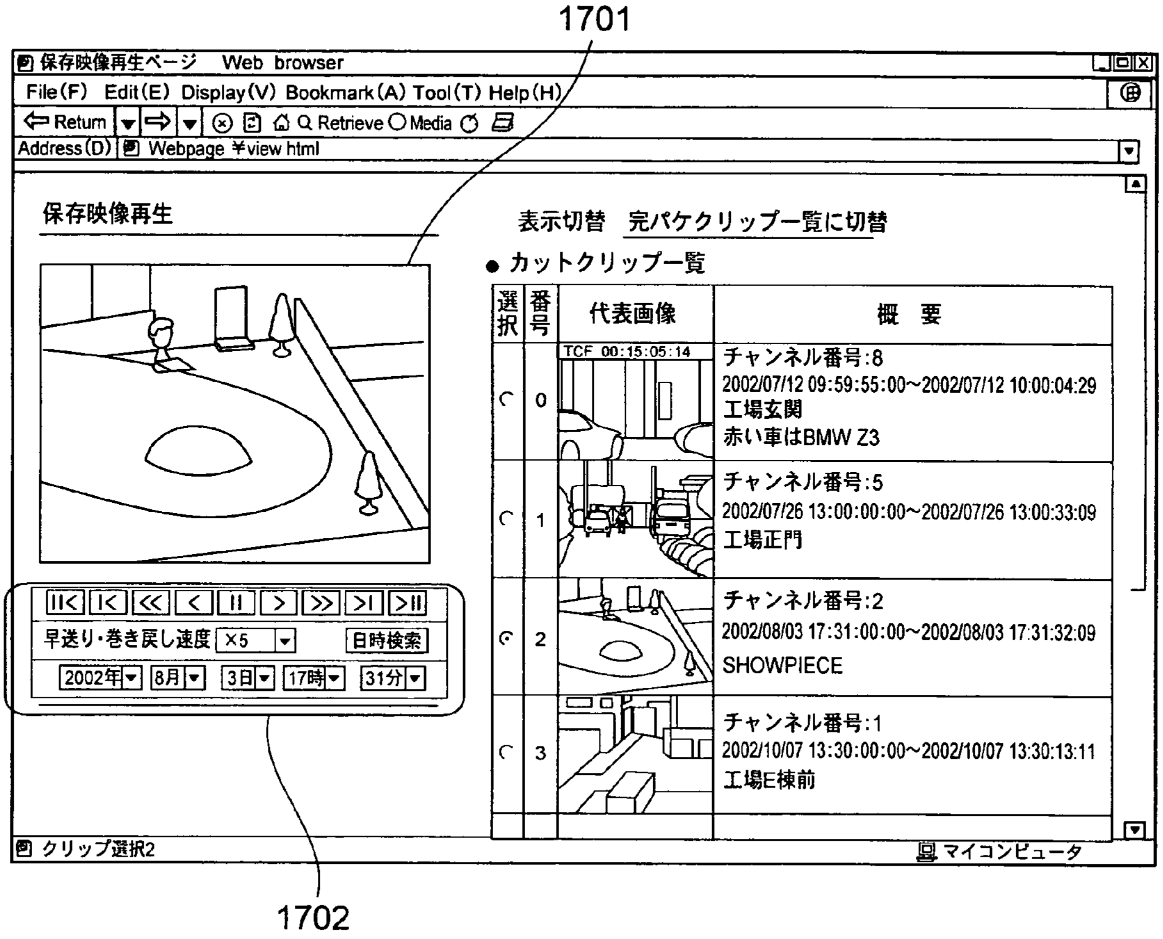
FIG. 20 is a diagram showing an embodiment of a picture displayed in the image display unit of the present invention.

In FIG. 19, when any of the image selection buttons, for example, the button 1903 is depressed, the picture is changed as FIG. 20. The top image of the selected images is displayed in the reproduced image display area 1701 and the state becomes the stop state (selection state). In this state, the button arranged in the reproduction operation area 1702 is operated to make reproduction. Note that the meaning of Japanese word クリップ選択2 newly appearing in FIG. 20 is "clip selection 2".

In FIG. 19, when reproduction, for example, forward reproduction is made, image from the in-point to the out-point of the storage section corresponding to the button 1903 is reproduced.

During various reproduction or in the selection state, when another image selection button is depressed, its processing is stopped if being reproduced, and image being reproduced is changed to another image. The top image of newly selected image is displayed in the reproduced image display area 1701 and the state becomes the stop state (selection state).

Figure 21:
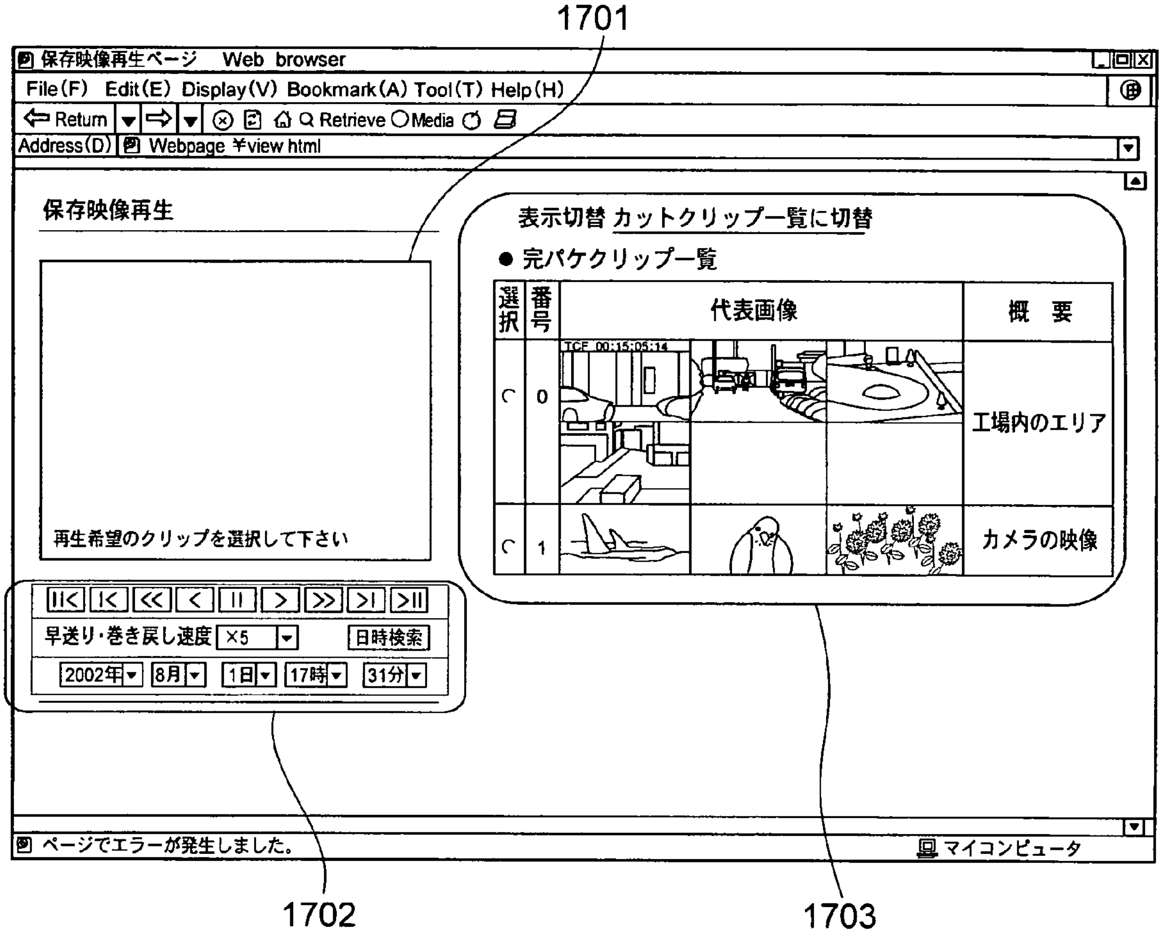
FIG. 21 is a diagram showing an embodiment of a picture displayed in the image display unit of the present invention.

In FIG. 17 or 20, when the mode change button 1913 is depressed, the picture is changed as FIG. 21. FIG. 21 shows an initial picture in case where the reproduction mode is changed to the storage execution image mode. In the same manner as FIG. 17, the initial picture is composed of three areas including the reproduced image display area 1701, the reproduction operation area 1702 and the list-of-image display area 1703. Note that the meanings of Japanese word newly appearing in FIG. 21 are as follows. ページでエラーが発生しました. . . error occurs in page, 完パケクリップ一覧. . . list of complete clips, 工場内のエリア. . . area in the factory area, カメラ映像. . . image from camera.

Figure 22:
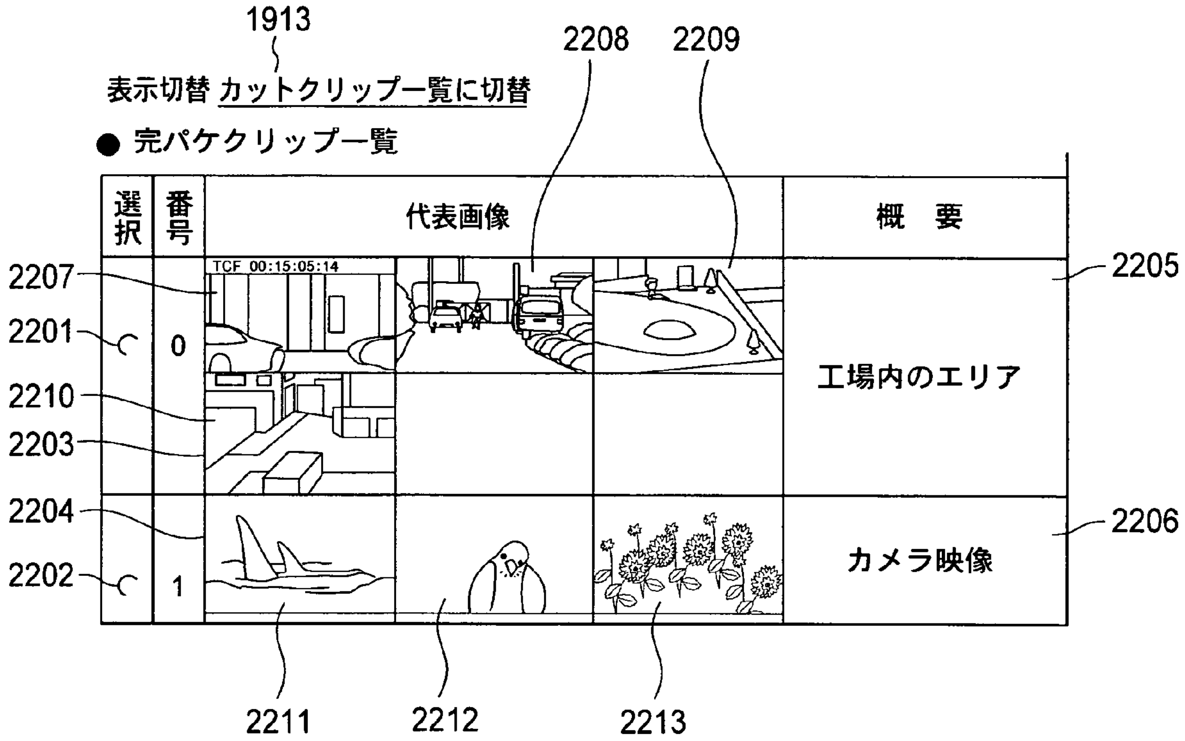
FIG. 22 is a diagram showing an embodiment of a picture displaying a list-of-image display area of the present invention on an enlarged scale.

FIG. 22 shows the list-of-image display area 1703 of FIG. 21 on an enlarged scale. FIG. 22 shows an embodiment of the present invention and two storage execution images are stored in the removable medium and displayed. Numeral 2201 and 2202 denotes image selection buttons, 2203 and 2204 representative image display columns, 2205 and 2206 various information display columns and 2207 to 2213 representative images.

The image selection buttons 2201 and 2202 are buttons for issuing command for selecting image data desired to be reproduced in the same manner as FIG. 19. When any one of the image selection button 2201 and 2202 is depressed, image to be reproduced is decided and the buttons arranged in the reproduction operation area 1702 can be operated to thereby make reproduction. In this example, when the image selection button 2201 or 2202 is depressed, only one image is selected, although a plurality of reproduced image display areas can be provided to thereby select a plurality of images.

The representative image display columns 2203 and 2204 are columns in which representative images of respective image data are displayed. A plurality of representative images 2207 to 2213 are displayed therein different from the storage section image mode of FIG. 19.

The plurality of representative images are representative images of the storage section images contained in the respective image. That is, FIG. 19 shows that two storage execution images in total including a storage execution image having four storage section images of the representative images 2207 to 2210 and a storage execution image having three storage section images of the representative images 2211 to 2213 are stored in the removable medium.

The various information display columns 2205 and 2206 are columns in which related information to each image, that is, remarks and the like designated upon storage are displayed.

In FIG. 21, when the image selection button, for example, the button 2201 is depressed, the picture is changed as FIG. 22. The top image of the selected images is displayed in the reproduced image display area 1701 and the state becomes the stop state (selection state). In this state, the button arranged in the reproduction operation area 1702 is operated to make reproduction.

In FIG. 22, when reproduction, for example, forward reproduction is made, the reproduction is made in order of from the in-point to the out-point of the storage section image data having the representative image 2207, from the in-point to the out-point of the storage section image data having the representative image 2208, from the in-point to the out-point of the storage section image data having the representative image 2209 and from the in-point to the out-point of the storage section image data having the representative image 2210.

During various reproduction or in the selection state, when another image selection button is depressed, its processing is stopped if being reproduced, and image being reproduced is changed to another image. The top image of newly selected image is displayed in the reproduced image display area 1701 and the state becomes the stop state (selection state).

The processing sequence concerning the above image selection and image reproduction operation is now described with reference to FIGS. 15 (16) and 23.

FIG. 23 shows an example of data description structure in the starting file opened by making URL or local file reference by means of the Web browser upon starting. Numeral 2301 denotes the starting file, 2302 description of reproduction software information, 2303 to 2305 description of storage section image information, 2306 and 2307 description of storage execution image information, 2308 description of stream file name and 2309 description of order.

As described above, the reproduction processing is started by making URL or local file reference to the starting file 2301 by means of the Web browser. The starting file 2301 is stored in the removable medium together with image data when the image storage is executed.

In the reproduction software information description 2302, information relative to software for reproducing the image stored in the removable medium is described. The reproduction software is started by the Web browser in accordance with this description and reproduction processing described later is made. The reproduction software may be, for example, a program described by the programming language that is operated without dependence on kinds of apparatuses or may be another program of plug-in type described in the language that is operated in most Web browser environment even with dependence on kinds of apparatuses.

With respect to the storage section image information descriptions 2303 to 2305, image stored in the removable medium is collected in a unit of storage section image and this collected information is described therein. FIG. 19 shows contents displayed on the basis of this information. In this example, only minimum requisite information is displayed, although even other various information concerning the section image information is described therein.

With respect to the storage execution image information descriptions 2306 and 2307, image stored in the removable medium is collected in a unit of storage execution image and this collected information is described therein. FIG. 22 shows contents displayed on the basis of this information. However, since the storage execution image contains the storage section image, it is redundant to describe information of the start and out-points therein. Accordingly, only order of the storage section images is described as the order description 2309 for reference. Description for remarks is provided separately since there is remark information peculiar to the storage execution image.

In FIG. 23, a prefix of ".¥" is attached to all of file names of files having description closing with "~file". This means that all of file names are described by relative positions to the starting file. This reason is that image stored in the single removable medium can be reproduced even by both of the network type and the stand-alone type. The image can be reproduced even by the stand-alone type regardless of difference in environment that an apparatus for reading out the removable medium is connected.

In the stream file name description 2308, reference information to the stream file is described. The stream file is a file in which reproduction order and storage locations of frame data for all the frames contained in the storage section image data are described. An example of data description structure in the file is shown in FIG. 24. Numeral 2401 denotes a stream file. This example shows ".¥Stream2.xml" described in the stream file name description 2308. Numerals 2402 to 2408 denote description of frame information.

Information of frames is described in the frame information descriptions 2402 to 2408. The order thereof is described by the number and the storage locations of frame data of the frames are described by the image file names. In this example, the data description structure is of file name reference description format, although when a plurality of frames constitute one file, the description format as file name plus byte offset value is available.

The starting file 2301 and the stream file 2401 are shown as separate files in the embodiment by way of example, although both the files may be provided as a combined form. Further, both the files are shown as a text file form in the embodiment by way of example, although both the files may be stored in the binary file form.

In FIG. 17, when the image selection button is depressed, the depression of the button and the object depressed are detected by the CPU 1501 or 1601. For example, when the image selection button 1903 is depressed, the CPU 1501 or 1601 detects that the depressed button is the image selection button 1903 and takes out information relative to the storage section image of the image selection button 1903 from the memory 1502 or 1602. The information is the contents described in the storage section image information description 2305 of the starting file 2301.

Reading out of the description contents of the starting file 2301 is made by the Web browser when URL or local file reference is first made to the starting file. The file is taken out from the removable medium 1403 connected to the Web server 1402 through the network interface 1503 in case of URL reference and the file is taken out from the removable medium 1408 through the recording interface 1604 in case of the local file reference and all the taken-out contents are stored in previously prepared area of the memory 1503.

The CPU 1501 or 1601 first writes the number information of the taken-out information into the memory 1502 or 1602 as the storage section image currently selected. The selected number information written in the memory 1502 or 1602 is outputted to the image display apparatuses 1405 and 1407 through the image output interface 1504 or 1603 as black dot representing that it is selected to be displayed.

Next, the CPU 1501 or 1601 reads the stream file name information of the taken-out information and takes out the described stream file. The taking-out of the stream file is performed by the reproduction software started from the removable medium 1403 connected to the Web serve 1402 through the network interface 1503 when URL reference is made to the starting file. Further, when the local file reference is made, the taking-out of the stream file is performed by the reproduction software started from the removable medium 1408 through the recording interface 1605.

The CPU 1501 or 1601 reads out description having the frame number of 0, that is, description concerning the top frame from the file contents and reads out the image file described in the description from the removable medium 1403 connected to the Web server 1402 through the network interface 1503 or reads out it from the removable medium 1408 through the recording interface 1605 to be stored in the memory 1502 or 1602. The image stored in the memory 1502 or 1602 is sent to the image codec 1505 or 1604 to be converted into a form that can be displayed by the image display apparatus 1405 or 1407 and stored in the memory 1502 again. The image data stored in the memory 1502 again is outputted to the image display apparatuses 1405 and 1407 through the image output interface 1504 and displayed in the reproduction image display area 1701 of FIG. 20.

In FIG. 20, when the buttons 1801 to 1816 arranged in the reproduction operation area 1702 is operated, its operation contents are detected by the CPU 1501 or 1601. The CPU 1501 or 1601 calculates the frame number of the image data to be next read out in accordance with the detected operation contents from the last reproduced and displayed frame number stored in the memory 1502 or 1602 and the operation contents and detects the frame description having the calculated frame number from the stream file. The CPU 1501 or 1601 reads out the image file described in the detected description from the removable medium 1403 connected to the Web server 1402 through the network interface 1503 or from the removable medium 1408 through the recording interface 1605 and stores it in the memory 1502 or 1602.

The subsequent processing performed until one frame is displayed is the same as the case where the image selection button is depressed and the processing sequence is repeated to make reproduction (displayed as dynamic image).

The image selection and image reproduction operation for the storage execution image are also realized by the substantially same processing sequence.

The foregoing is description of the stored image reproduction system of the present invention.

As described above, according to the embodiment, the storing and delivering server and the long-term storage type recording apparatus are provided separately and connected through the network to each other. The two-stage configuration system is adopted in which the image desired to be stored for a long time is stored in the long-term storage type recording apparatus in the form of re-recording, so that the system in which respective weak points are supplemented and respective advantages are utilized can be provided.

More particularly, the storing and delivering server maintains nonstop operation in which live image is recorded without error and the long-term storage type recording apparatus facilitates storage over a long time of recording medium.

The long-term storage type recording apparatus provides the method that any image in the storing and delivering server can be stored selectively, particularly the method that it is easy to grasp stored contents visually, so that recording of only necessary image is possible and the saving of recording medium, that is, reduction of cost is realized.

Further, the long-term storage type recording apparatus provides the system capable of using the removable medium to thereby realize easiness of storage.

Moreover, the long-term storage type recording apparatus provides the system capable of using the removable medium having generally slow recording speed but cheap unit price to thereby realize reduction of cost.

The long-term storage type recording apparatus provides the system capable of using the removable medium to thereby realize easiness of storage.

In addition, the stored image reproduction apparatus provides the system of displaying the long-term stored images as a list together with related information such as remarks to thereby make it possible to grasp contents smoothly even if contents of image are forgotten when it is looked after a long-term storage.

Further, the system in which the reproduction software is combined with the image to be reproduced to be stored in the removable medium is provided to thereby make it possible to reproduce the image by a similar reproduction apparatus which can read the removable medium even if a dedicated reproduction apparatus is not provided.

Furthermore, the above system is provided to thereby make it possible to look the long-term stored image over a long term without influence of changed version of the reproduction software.

As described above, according to the present invention, the image desired to be stored for a long time of the images recorded in the storing and delivering serve can be recorded in the long-term storage type recording apparatus again.

In other words, the storing and delivering server maintains nonstop operation that live image is recorded without error and the long-term storage type recording apparatus facilitate storage by recording medium over a long time.

Further, according to the present invention, only necessary image can be recorded to thereby realize saving of recording medium, that is, reduction of cost. In addition, the removable medium can be used to thereby realize easiness of storage.

Moreover, according to the present invention, the removable medium having generally slow recording speed but cheap unit price to thereby realize reduction of cost.

Further, according to the present invention, the long-term stored images are displayed as a list together with related information such as remarks to thereby make it possible to grasp contents smoothly even if contents of image are forgotten when it is looked after a long-term storage.

Further, according to the present invention, the reproduction software is combined with the image to be reproduced to be stored in the removable medium to thereby make it possible to reproduce the image by a similar reproduction apparatus which can read the removable medium even if a dedicated reproduction apparatus is not provided.

Furthermore, according to the present invention, the long-term stored image can be looked over a long time without influence of changed version of the reproduction software.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of storing image data, comprising the steps of:
- obtaining image data from an image pick-up unit;
- recording said image data in a first recording apparatus;
- retrieving said image data recorded in said first recording apparatus in accordance with a predetermined retrieval condition;
- displaying said retrieved image data as a list of information relating to said retrieved image data on a display; and
- selecting a predetermined information from said list of information, reading image data related to the selected predetermined information from said first recording apparatus, by comparing the selected predetermined information to image data recorded in said first recording apparatus, selecting for read out image data related to the selected predetermined information based on the comparison and reading out the selected image data, and recording said read out image data related to the selected predetermined information in a second recording apparatus,
- wherein said read out image data is image data specified by said selecting as specified image data to be preserved over a long period of time,
- wherein when a total amount of all specified image data to be preserved over a long period of time in said second recording apparatus exceeds an unoccupied portion of said second recording apparatus, an indication of such is provided on said display,
- wherein said image data is further added with time information indicating when said image data is obtained and said list of information contains said time information, and
- wherein said image pick-up unit comprises a plurality of image pick-up devices and said image data obtained from each of said image pick-up devices is added with an identifier (ID) for identifying each of said image pick-up devices, said list of information further containing said ID.

2. A storing method of image data according to claim 1, wherein said image data contains information from a sensor and said list of information contains information from said sensor.

3. A storing method of image data according to claim 1, wherein said step of displaying said retrieved image data as said list further includes a step of designating in-point and out-point for selecting desired image data.

4. A storing method of image data according to claim 1, wherein said recording said read out image data related to the selected predetermined information in said second recording apparatus further includes a step of recording reproduction software for reproducing said recorded image data together with said image data.

5. A system for storing image data comprising:
- a plurality of image pick-up units for outputting image data;
- a transmission unit for transmitting said image data from said plurality of image pick-up units to a transmission path;
- a first recording apparatus, coupled with said transmission path, for recording said image data from said plurality of image pick-up units;
- a retrieving processing unit for retrieving said image data recorded in said first recording apparatus in accordance with a predetermined retrieval condition;
- a display unit for displaying said retrieved image data as a list of information relating to said retrieved image data;
- a selector for selecting predetermined information from said list of information and reading out image data related to the selected predetermined information from said first recording apparatus, by comparing the selected predetermined information to image data recorded in said first recording apparatus, selecting for read out image data related to the selected predetermined information based on the comparison and reading out the selected image data; and
- a second recording apparatus for recording said read out image data related to the selected predetermined information,
- wherein said read out image data is image data specified by said selector as specified image data to be preserved over a long period of time,
- wherein when a total amount of all specified image data to be preserved over a long period of time in said second recording apparatus exceeds an unoccupied portion of said second recording apparatus, an indication of such is provided on said display, and
- wherein said image data obtained from each of said plurality of image pick-up units is added with an identifier (ID) for identifying each of said plurality of image pick-up units and said list of information further contains said ID.

6. A storing system of image data according to claim 5, further comprising:

a sensor, wherein said image data contains information from said sensor and said list of information contains information from said sensor.

7. A storing system of image data according to claim 5, wherein said image data is further added with time information indicating when said image data is obtained and said list of information contains said time information.

* * * * *